(12) United States Patent
Ellison et al.

(10) Patent No.: US 12,112,338 B2
(45) Date of Patent: Oct. 8, 2024

(54) ASSISTANCE FOR CUSTOMER SERVICE AGENTS

(71) Applicant: T-Mobile USA, Inc., Bellevue, WA (US)

(72) Inventors: James Ellison, Issaquah, WA (US); Mark Hanson, Plano, TX (US); Joel Werdell, Seattle, WA (US); Stephen King, Seattle, WA (US); Christopher Mills, Bellevue, WA (US); Phoebe Parsons, Redmond, WA (US); Kasey Snow, Renton, WA (US); Rudy Bourcelot, Everett, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 209 days.

(21) Appl. No.: 17/317,751

(22) Filed: May 11, 2021

(65) Prior Publication Data

US 2021/0350384 A1    Nov. 11, 2021

Related U.S. Application Data

(60) Provisional application No. 63/032,438, filed on May 29, 2020, provisional application No. 63/023,077, filed on May 11, 2020.

(51) Int. Cl.
*G06Q 30/016* (2023.01)
*G06N 20/00* (2019.01)

(52) U.S. Cl.
CPC ........... *G06Q 30/016* (2013.01); *G06N 20/00* (2019.01)

(58) Field of Classification Search
CPC .................................................. G06Q 30/016
See application file for complete search history.

(56) References Cited

U.S. PATENT DOCUMENTS 8,161,386 B1   4/2012  Mark
8,195,468 B2   6/2012  Weider et al.
(Continued)

FOREIGN PATENT DOCUMENTS

WO   WO-2005122544 A1 * 12/2005   ........... G06Q 30/016
WO      2007106113 A2    9/2007
(Continued)

OTHER PUBLICATIONS

Lee, "Machine learning for enterprises" (Year: 2019).*
(Continued)

*Primary Examiner* — Sangeeta Bahl

(57) ABSTRACT

Methods, systems, and apparatus, including computer programs encoded on a computer storage medium, for implementing assistance for customer service agents are disclosed. In one aspect, a method includes the actions of receiving, by a computing device, customer interaction data that reflects an interaction between a first user and a second user. The actions further include receiving, by the computing device, a customer summary file that reflects characteristics of the first user. The actions further include, based on the customer interaction data and the customer summary file, determining, by the computing device, instructions for the second user to continue interacting with the first user during the interaction between the first user and the second user. The actions further include, based on determining the instructions, providing, for output to the second user, the instructions for the second user to continue interacting with the first user.

13 Claims, 11 Drawing Sheets

(56) References Cited

U.S. PATENT DOCUMENTS

| | | | |
|---|---|---|---|
| 8,634,537 B2* | 1/2014 | Hollatz | H04L 65/401 |
| | | | 370/352 |
| 9,645,994 B2* | 5/2017 | Agarwal | G06F 40/279 |
| 10,635,695 B2* | 4/2020 | Seth | H04L 51/04 |
| 10,880,435 B2* | 12/2020 | Fang | G06Q 30/016 |
| 10,896,428 B1* | 1/2021 | Balasubramaniam | |
| | | | G10L 15/1815 |
| 11,076,047 B1* | 7/2021 | Clodore | H04M 3/5175 |
| 11,367,080 B2* | 6/2022 | Konig | G06Q 30/016 |
| 11,625,556 B1 | 4/2023 | Gaeta et al. | |
| 2006/0080107 A1 | 4/2006 | Hill et al. | |
| 2014/0297268 A1 | 10/2014 | Govrin et al. | |
| 2015/0363393 A1 | 12/2015 | Williams et al. | |
| 2016/0189164 A1* | 6/2016 | Tolksdorf | G06Q 30/016 |
| | | | 705/304 |
| 2017/0163584 A1 | 6/2017 | Meng et al. | |
| 2018/0007102 A1 | 1/2018 | Klein et al. | |
| 2019/0034780 A1 | 1/2019 | Marin et al. | |
| 2019/0103111 A1* | 4/2019 | Tiwari | G06F 16/3329 |
| 2019/0191031 A1* | 6/2019 | O'Connor | H04M 3/5141 |
| 2019/0258714 A1 | 8/2019 | Zhong et al. | |
| 2020/0019893 A1* | 1/2020 | Lu | G06N 5/025 |
| 2020/0065857 A1 | 2/2020 | Lagi et al. | |
| 2020/0097563 A1 | 3/2020 | Alexander et al. | |
| 2020/0097814 A1 | 3/2020 | Devesa | |
| 2020/0134635 A1 | 4/2020 | Podgorny et al. | |
| 2020/0257996 A1 | 8/2020 | London | |
| 2020/0285699 A1 | 9/2020 | Nogima et al. | |
| 2020/0412868 A1 | 12/2020 | Jones et al. | |
| 2021/0004817 A1 | 1/2021 | Adibi et al. | |
| 2021/0004828 A1 | 1/2021 | Adibi et al. | |
| 2021/0073656 A1 | 3/2021 | Pan et al. | |
| 2021/0157834 A1 | 5/2021 | Sivasubramanian et al. | |
| 2021/0158234 A1 | 5/2021 | Sivasubramanian et al. | |
| 2021/0203784 A1 | 7/2021 | Konig et al. | |
| 2021/0272584 A1 | 9/2021 | McAlpine et al. | |
| 2021/0342542 A1 | 11/2021 | James et al. | |
| 2022/0046129 A1 | 2/2022 | Clodore et al. | |
| 2022/0215323 A1 | 7/2022 | Dake et al. | |

FOREIGN PATENT DOCUMENTS

| | | | | |
|---|---|---|---|---|
| WO | WO-2015106171 A1 * | 7/2015 | | H04M 3/5175 |
| WO | 2018129389 A1 | 7/2018 | | |

OTHER PUBLICATIONS

Lam, "Optimizing customer agent interactions with NLP and machine learning" (Year: 2019).*

Colette "A Mentor Program Improve Performance and Retention of Customer Service Representative", Sep. 2009, ePublications atRegis University, pp. 1-111 (Year: 2009).

Ehrens, "Customer Segmentation", Apr. 2019, https://www.techtarget.com/searchcustomerexperience/definition/customer-segmentation (Year: 2019).

U.S. Appl. No. 17/317,765, Final Office Action mailed Apr. 17, 2023, 29 pages.

U.S. Appl. No. 17/317,765, Office Action mailed Oct. 4, 2022, 29 pages.

U.S. Appl. No. 17/345,355, Office Action mailed May 11, 2023, 34 pages.

U.S. Appl. No. 17/317,765, Notice of Allowance mailed May 8, 2024, 15 pages.

U.S. Appl. No. 17/370,844, Advisory Action mailed May 9, 2024, 9 pages.

U.S. Appl. No. 17/370,844, Final Office Action mailed Feb. 15, 2024, 43 pages.

U.S. Appl. No. 17/317,765, Office Action mailed Oct. 5, 2023, 37 pages.

U.S. Appl. No. 17/345,355, Notice of Allowance mailed Oct. 18, 2023, 28 pages.

U.S. Appl. No. 17/370,844, Office Action mailed Jul. 20, 2023, 49 pages.

* cited by examiner

ASSISTANCE FOR CUSTOMER SERVICE AGENTS

CROSS-REFERENCE TO RELATED APPLICATIONS

This application claims the benefit of U.S. Application 62/023,077, filed May 11, 2020, and U.S. Application 63/032,438, filed May 29, 2020, which are both incorporated by reference.

BACKGROUND

It has become common for a provider of goods and/or services to operate a contact center. A customer of the provider may contact the contact center and thereby be connected with a customer service agent (herein "agent") who can help the customer with certain issues that the customer may have such as service reconfiguration and/or billing issues.

BRIEF DESCRIPTION OF THE DRAWINGS

The detailed description is depicted with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
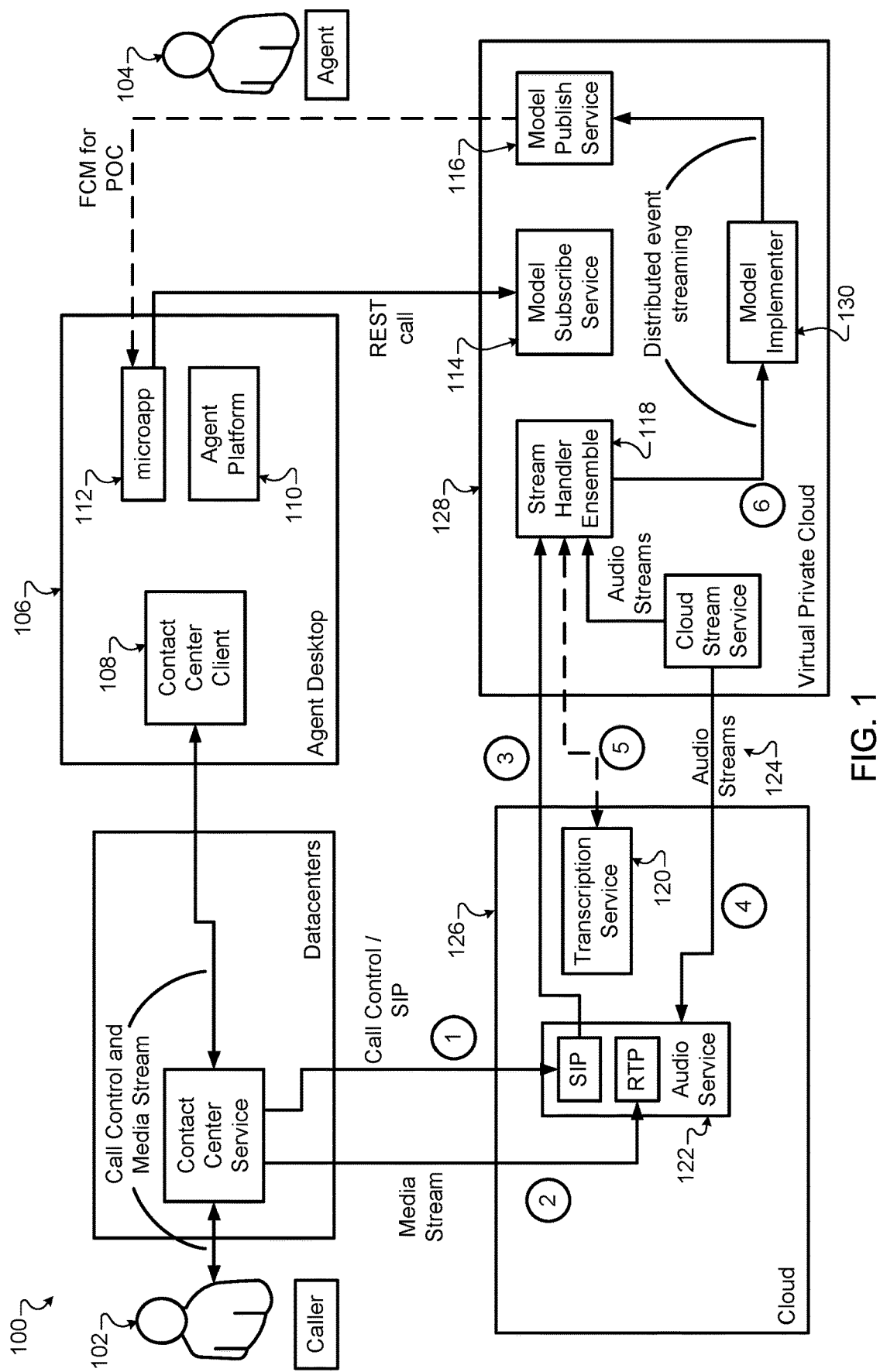
FIG. 1 is a schematic diagram illustrating aspects of an example computer systems architecture in accordance with at least one embodiment.

A contact center may have many agents (e.g., thousands or more) with differing levels of experience and/or ability. Agents with high levels of experience and/or ability ("skilled agents") may be much more effective in achieving high levels of customer satisfaction and other goals compared with agents of lower levels of experience and/or ability ("unskilled agents"). It is desirable that the performance of unskilled agents be elevated to that of skilled agents. However, conventional systems and methods for attempting this have multiple shortcomings.

For example, contact centers can have high agent turnover, resulting in a loss of skilled agents and an ever-fresh supply of unskilled agents. Skilled agents can be assigned as supervisors of unskilled agents, but this results in a loss of the skilled agent in directly providing customer service. In some contact centers, supervisors 'walk the floor' looking for unskilled agents who seem to need assistance, judging who to help by the one side of the customer service conversation that they can overhear. Any knowledge gleaned may be captured with sticky notes plastered around workstations and/or in 'tips and tricks' text documents exchanged via email. Such cad hoc' methods can be inefficient and/or ineffective.

Some contact centers record calls and conduct systematic reviews. However, relatively few calls are ever reviewed since the process is labor intensive, and any resulting feedback may not be timely. Some contact centers require agents to manually draft a summary of each call. However, such summaries can be inaccurate and/or omit important details including details for which feedback would be most valuable (e.g., details enabling determination of causes of failure to achieve customer service goals).

Embodiments described herein address these and other problems as will be apparent to one of skill in the art from the figures and description.

This disclosure is directed to techniques for providing assistance to customer service agents. A voice call between a customer and an agent may be automatically transcribed in real-time with speech to text technology. The voice call and the transcripts may be processed by machine learning (ML) models to identify call features such as conversation topics and facts, important (e.g., goal relevant, related to customer satisfaction, related to resolving an issue on the first call from a customer, related to billing, related to the user's equipment, related to quality of service, and/or related to revenue) conversation portions, caller sentiment, propensity to purchase a good or service, propensity to unsubscribe from a service, and the like. Call features may be correlated with historical conversations and/or conversation portions that have a high or low likelihood of achieving customer service goals such as customer satisfaction, resolution of an issue during a single call ("first call resolution"), goals related to particular conversation topics (e.g., billing, user equipment, quality of service), and revenue goals. In real-time during the call, suggested responses to a customer in the context of the conversation may be presented to the agent engaged in the call. For example, the agent may be presented with 3-4 responses that are historically most likely to result in the agent achieving their goals, as well as other related information and/or suggestions for directing the conversation such as relevant offers or anti-churn dialogs. Such suggested responses may effectively transfer knowledge from skilled agents to unskilled agents in an automated manner, elevating the performance of unskilled agents, for example, with respect to agent goals. Call features identified by ML models may also be used to draft a call summary (sometimes called a "call memorandum") including identified call facts and verbatim transcripts of conversation portions identified as important.

FIG. 1 depicts aspects of an example computer systems architecture 100 in accordance with at least one embodiment. A caller 102 (e.g., a customer or a service subscriber) may engage in a voice call with an agent via a contact center service. The agent 104 may have a computer workstation displaying an agent desktop with one or more tools, utilities, applications and/or micro-applications (e.g., application components and/or plug-ins that use facilities of an application platform and/or hub) that aid the agent in providing customer service to the caller 102. For example, a contact center client 108 may provide voice call controls (e.g., answer, hang up, volume, mute, and other similar controls) as well as present caller details such as caller name and account status obtained from a customer database (not shown on FIG. 1). A contact center client 108 may be a device that an agent uses to view details related to a caller while the agent is talking or messaging with the caller. The contact center client 108 may display an interface for an agent application platform may provide information to and enable functionality for one or more micro-applications 112 ("microapps") that provide assistance to the agent 104 beyond the basic call controls and caller details. For example, one or more microapps 112 may use the output of one or more ML models published with an ML model output publishing service. In accordance with at least one embodiment, the microapps 112 may interact with ML model 130 output using a publish/subscribe 114 and 116 service maintained for the purpose.

Some of the ML models may use call audio as input, for example, to determine caller sentiment or accent. Other ML models may use transcribed text as input. Co-ordination of the call audio stream 124 and the corresponding transcribed text stream may be managed by a stream handler ensemble. The stream handler ensemble 118 may include any suitable stream handler and may co-ordinate and/or synchronize multiple streams (e.g., multiple related streams). Coordination can be important to enable real-time presentation of call transcripts and corresponding call features as identified by the ML models. The audio stream 124 may be facilitated by an audio streaming service 122, and the corresponding transcribed text stream may be generated by a transcription service 120. The audio streaming service the transcription service, the ML models, and/or any other suitable component of the architecture may be hosted locally (sometimes called "on premises") and/or by a cloud computing provider (hosted "in the cloud"). The audio streaming service 122, the transcription service 120, the ML models, and/or any other suitable component of the architecture may be hosted locally (sometimes called "on premises") and/or by a cloud computing provider 126 (hosted "in the cloud"). Where hosted in the cloud 126, the transcription service, audio streaming service, ML models 130, and/or any other suitable component of the architecture may be hosted in a public portion of the cloud (e.g., in a portion of the cloud accessible from the public internet), and/or in a private portion of the cloud (e.g., in a virtual private cloud 128 or VPC).

The sentiment of a caller 102 may include whether the caller is angry, frustrated, satisfied, relieved, difficult. To train a ML model 130 to detect sentiment, the training data may include transcriptions or audio of previous support calls. Each line in the transcription may be labeled with a sentiment. Depending on whether the training data includes transcriptions or audio, the ML model 130 may be configured to receive a transcription or audio and output data indicating a sentiment of the caller. In some implementations, the training data may be manually labeled. In some implementations, the training data may be automatically labeled. For example, the automatic labeler may identify keywords that indicate anger, frustration, satisfaction, relief, and other similar emotions. The automatic labeler may identify changes in the tone of the caller's voice by identifying a change in pitch and/or volume. The labeler may label an increase in volume or pitch as angry. The labeler may label a decrease in volume or pitch as relief. The labeler may identify changes in the cadence of the caller's speech such as slower speech, faster speech, staccato speech, etc. An increase in the cadence may be labeled as angry, and a decrease in cadence may be labeled as relief. In some implementations, the automatic labeler may use a combination of volume, pitch, cadence, keywords, and other speech patterns to label the training samples. In some implementations, the automatic labeler may determine the sentiment of a real-time call instead of the ML model.

In some implementations, an ML model may be trained to determine a type of accent of the caller 102. This may assist in the selection of the appropriate ML model to determine sentiment if there are multiple ML models trained on groups of training samples that include similarly accented speech.

If an ML model detect a change in sentiment, the microapp 112 that subscribes to the output of the sentiment model may display a suggestion to the agent to adjust the agent's approach to the caller. Some suggestions may include soften the agent's tone, use neutral language to acknowledge and engage the customer's sentiment, asking the agent to verify with the caller whether the agent understands the problem, and/or other similar suggestions.

Each incoming call may be associated with a session initiation protocol (SIP) session. For example, the contact center service 105 may establish a SIP session with an audio service for each call and use SIP to pass call details to the audio service including a computer telephony integration (CTI) key and/or globally unique identifier (GUID) for use in co-ordination by the stream handler ensemble 118 and/or at the agent desktop 106. Each call may be associated with an incoming call audio stream (e.g., from the caller) and an outgoing call audio stream (e.g., from the agent). Each of the incoming and outgoing streams may be processed (e.g., transcribed) separately, for example, to maintain association with a current speaker in a real-time context. The incoming and outgoing streams may be managed as 2 channels of audio in accordance with a real-time transport protocol (RTP).

A SIP module of the audio service 122 may generate stream status events. The stream handler ensemble may use the stream status events to coordinate audio and/or transcription streams, for example, the stream handler ensemble may use the stream status events to control invocations of the transcription service 120, such as selecting portions of the audio that are selected for transcription, which may prevent transcribing unnecessary portions of the conversation, such as the part of the conversation that occurs after the problem as has been resolved. The stream handler ensemble 118 may use the GU ID associated with the call to request a particular audio stream from the audio service and may further stream the audio to the transcription service. Connections between services may be maintained as open connections to improve performance. The stream handler ensemble 118 may publish results of the transcription to interested consumers such as the various ML models (e.g., using a publish/subscribe mechanism).

The transcription service 120 may be configured to transcribe the caller audio stream 124 and/or the agent audio stream 124. In some implementations, the transcription service 120 may use a general vocabulary to transcribe the audio streams. In some implementations, the transcription service may use a custom vocabulary to transcribe the audio streams. A custom vocabulary may help to improve the accuracy of the transcription and the speed at which the transcription service can generate a transcription. The custom vocabulary may include words and terms that are likely to appear in the context of a support call. The custom vocabulary may be weighted such that the transcription service may be more likely to select a particular term when a portion of the speech may sound similar to the particular and other terms.

In some implementations, the transcription service 120 may use a custom language model that includes phrases that are more likely to appear in the context of a support call. The custom language model may also improve the speed at which the stream handler ensemble can generate a transcription. The custom language model may include the terms of the custom vocabulary.

The transcription service 120 may be configured to process the caller audio stream and/or the agent audio stream to identify various emotions and/or sentiments in the audio streams. The transcription service 120 may identify abnormally loud speech that may be speech that is above a threshold decibel level. Abnormally loud speech may indicate that the speaker is yelling. The transcription service 120 may be configured to identify particular terms in the transcription that may indicate an emotion and/or sentiment. Some terms may be labeled as suggesting a particular emotion and/or sentiment. If the transcription service identifies those terms in the transcription, then the transcription service 120 may assign that emotion and/or sentiment to the speaker.

The architecture 100 may also include additional ML models 130 that receive a transcription of the audio stream or the audio stream itself. One of those ML models may be an importance model. The importance model may be configured to receive a transcription of an audio stream and output data indicating an importance level of the transcription. In some implementations, a component of the architecture may constrain itself to provide the transcription to one or more of the microapps or other recipients (e.g., other ML models) if the importance level satisfies a threshold. The threshold may be different for different microapps and other recipients. In some implementations, a component of the architecture may constrain itself to update the agent-facing user interface for the case that the importance level satisfies a threshold.

The training data for an importance model may include a plurality of conversation transcriptions. Each line of the transcriptions may include a label that identifies the line as either important or not important. Some lines that may be not important may be social banter, such as "Hi, how are you?" and "Thank you for your help today." Some lines that may be important include "I'm having trouble with my reception," and "Have you tried rebooting your device?" In some implementations, the training data may be grouped into training samples that each include the history of the conversation, the most recent statement, and the importance label of the most recent statement. In some implementations, the training data may be grouped into training samples that include the most recent statement and the importance label of the most recent statement. Based on the training samples in the training data the importance model may receive, as input, the history of the conversation and the most recent statement or only the most recent statement. The importance model may output data indicating the importance of the most recent statement, for example, a number between zero and one, where zero is least important and one is most important.

A component of the architecture 100 may be configured to determine when to provide a transcription to one or more of the ML models. It may be advantageous to limit the calls to the ML models because each call to an ML model may be computationally and/or financially expensive and may not provide information that is helpful to the agent. For example, the component of the architecture may provide a transcription to the ML models after the transcription service identifies a new word. While this technique may ensure that nearly all the useful information is provided to the agent in a timely manner (e.g., sufficiently quickly to enable prompt action), it may degrade the performance of the system running the models. As another example, the component of the architecture may provide a transcription to the ML models after the end of the conversation. While this technique may ensure that the system running the models will avoid a drop in performance, the agent may not receive sufficient useful information in a timely manner. Finding an optimal frequency to call the ML models is beneficial to both the agent and the system running the models.

If the conversation between the agent 104 and the caller 102 is over a messaging application, a component of the architecture may be configured to provide a transcription to the ML models when the agent 104 or the caller 102 sends a message to the other party. If the conversation between the agent and the caller is a voice call, then the component of the architecture may provide a transcription to the ML models after each word, after a full stop, after receive a complete utterance flag from the transcription service, after a speaker pause, or any other similar place in the utterance or transcription. In some instances, the calling the ML models after receiving a complete utterance flag may provide an appropriate balance between providing the agent with useful information while preventing the system running the ML models from being over taxed.

A component of the architecture 100 may provide a transcription of each complete utterance to the importance model. The component of the architecture may receive data indicating the importance level of the utterance. In some implementations, the component of the architecture may automatically assign an importance score of zero to incomplete utterances. The component of the architecture may take various actions based on the importance score and whether the importance score satisfies a threshold. For example, the component of the architecture may provide the transcription to an additional model if the importance score satisfies a threshold, for example, 0.4. As another example, the component of the architecture may provide the transcription to the agent-facing interface if the importance score satisfies a threshold, for example, 0.3. This technique may effectively filter the utterances, so that the agent only sees the important utterances and does not see utterances such as niceties and social banter. As another example, the component of the architecture may provide the transcription to one or more microapps if the importance score satisfies a threshold, for example, 0.35.

In some instances, a component of the architecture 100 may receive audio streams of a caller 102 and an agent 104 without data indicating which is the caller, which is the agent, or which agent is talking to which caller 102. Without this information, it may be difficult for the component of the architecture to determine where to send output from the various models and/or an appropriate action to take on the audio stream. The component of the architecture may be configured to analyze an audio stream from an agent differently than an audio stream from a caller. For example, the component of the architecture may be configured to provide the audio streams from the callers and the agents to the transcription service. The component of the architecture may be configured to provide the transcriptions of the utterances of the callers to the importance model but not the transcriptions of the utterances of the agents. In some implementations, the component of the architecture may be configured to provide the transcriptions of the callers and the agents to the importance model. As another example, the component of the architecture may be configured to provide the outputs of the various models to an agent-facing user interface. The component of the architecture may require information as to which agent is conducting a call with which caller to determine the appropriate agent-facing user interface to send the output.

During a phone call, the agent 104 is viewing the agent-facing interface. The agent-facing interface may be in a web browser or other similar application and may include an agent-facing interface identifier that identifies the particular agent as viewing that agent-facing interface. The agent-facing interface may subscribe to data from the ML models and other processing units using the agent-facing interface identifier. This agent-facing interface identifier may not be part of the audio streams received by a component of the architecture. Instead, an audio stream of an agent may include an identifier that uniquely identifies the agent. This identifier may be different than the agent-facing interface identifier. The component of the architecture may use a mapping technique to convert the audio stream identifier to the agent-facing interface identifier. The component of the architecture may then attach the mapped agent-facing interface identifier to the audio stream so that any related processing of the audio stream returns to the agent-facing interface that subscribes to the mapped agent-facing interface identifier.

A component of the architecture 100 may use various techniques to determine whether an audio stream is from a caller or an agent. In some implementations, the component of the architecture may provide the audio stream or the transcription to an ML model that is trained to determine whether the audio stream or transcription is from an agent or a caller. The ML model may output data indicating whether the audio stream or transcription is from an agent or a caller. The ML model may be trained using training data that includes training samples that each include an audio stream or transcription and a label that indicates agent or caller. The training samples, and the appropriate input to the ML model, may include the audio or transcription history of the same person as spoken during the same call.

In some implementations a component of the architecture may receive two audio streams of a support call. Each audio stream may include information that identifies that the audio streams are part of the same support call but does not include information that identifies whether an audio stream belongs to the agent or the caller. The component of the architecture may label the audio stream of the first speaker as the agent. The component of the architecture may label the second speaker as the caller. The information that identifies that the audio streams are part of the same support call may be an agent PBX identifier. The agent PBX identifier may be part of the audio stream received in the SIP message. The component of the architecture may apply the agent PBX identifier to the RTP message. The agent PBX identifier may be mapped to the agent-facing interface identifier. The component of the architecture may include a mapping module that is configured to determine which agent-facing interface identifier is mapped to which agent PBX identifier. The mapping module may include a local copy of the data that maps each agent PBX identifier to a respective agent-facing interface identifier. In some implementations, the component of the architecture may make an API call to a different mapping module and request the agent-facing interface identifier for a specified agent PBX identifier, or vice versa.

In some implementations, the infrastructure in FIG. 1 may have been initially designed for other purposes than analyzing audio streams of support calls in real-time to improve customer service. The infrastructure may be configured to record audio streams instead of analyze audio streams in real-time. Because the infrastructure was designed to record audio streams, a component of the architecture may have to take additional actions to identify the agent and the caller and to determine which agent-facing interface to provide outputs from the analysis. The infrastructure was designed to record audio streams may be a forking mechanism (e.g., SIP REC) that forks the audio stream to a recording service for later review. Instead of recording the audio for later review, the cloud and a component of the architecture perform real-time analysis on the audio stream.

In some implementations, the stream handler ensemble 118 may be configured to receive audio streams from multiple different services. Each of these services may be configured to provide multiple audio streams such that the stream handler ensemble is receiving multiple audio streams from each of multiple different services. It may be helpful for the stream handler ensemble to track the source of each audio stream so that the stream handler ensemble and/or a component of the architecture can provide any data relating to that audio stream to the source or another appropriate location.

The stream handler ensemble 118 may have a stateful connection with the audio service and/or the cloud stream service. This stateful connection may require that the stream handler ensemble open a connection and stream audio through that connection. The streamed audio and/or the results from processing the streamed audio may need to return to the same node that was processing the streamed audio. If the node is removed or deactivated, then the state is lost. Additionally, the transcription service receives an audio stream and is aware of the open connection to the audio stream. The transcription service is responsible for generating a transcription of that audio stream.

In order to scale the stateful connection of the stream handler ensemble and the stateful connection of the transcription service to the level of handling several hundred service calls simultaneously, the transcription service and the stream handler ensemble 118 may require a stateless message bus (e.g., a distributed write-ahead log and/or a stream-processing software platform) developed to transfer the audio streams and/or other information between the transcription service and the stream handler ensemble. The transcription service and the stream handler ensemble may exchange information over the stateless message bus to achieve scalability and resiliency. The information exchanged over the stateless message bus may include data related to when an audio stream begins and ends, data related to coordinating the opening and closing of the audio streams, and/or data that specifies the audio stream to which the exchanged information relates.

In some implementations, each subscription that a microapp 112 has to an output of a model is independent of other subscriptions and microapps. Some of the outputs from the models may be disregarded by the microapps. Different outputs by the same model maybe provided to different microapps. Each microapp may determine whether to take an action based on that output. By providing the model output to the microapps that subscribe to that model even when a microapp may disregard the output, there is no need to include an additional module to determine whether to route the model output to the microapps that subscribe to the model.

Figure 2:
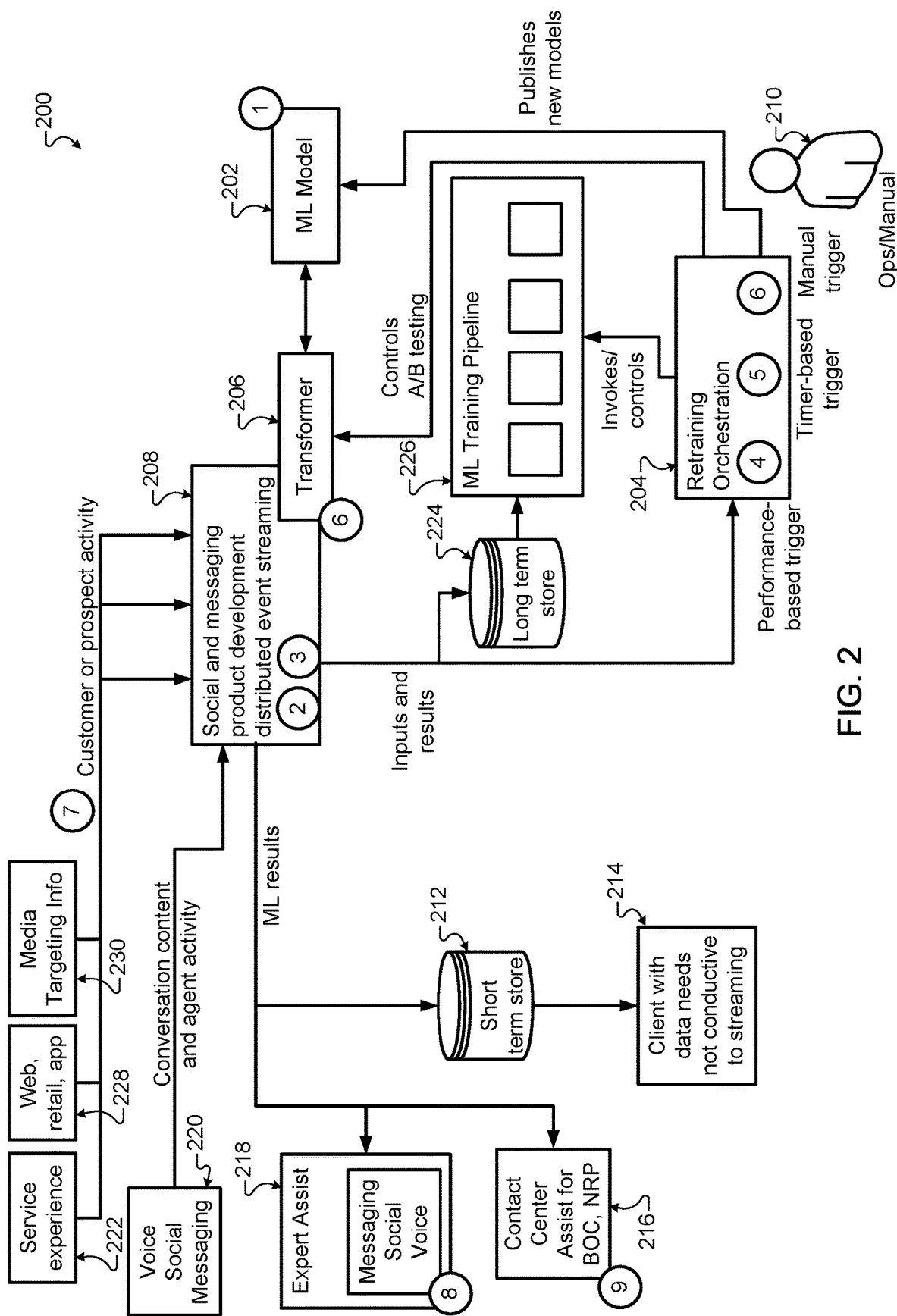
FIG. 2 is a schematic diagram illustrating further aspects of the example computer systems architecture in accordance with at least one embodiment.

FIG. 2 depicts further aspects of the example computer systems architecture 200 in accordance with at least one embodiment. ML models may be trained and deployed. ML models 202 may detect, identify and/or classify call features such as an identity of an agent participating in a call, demographic features of a caller, initial call reason, a fact in a conversation or conversation portion, a topic of a conversation or conversation portion, a change of topic in a conversation or conversation portion, a propensity of a caller to unsubscribe from a service ("propensity to churn"), and a propensity of a caller to purchase a good or service ("propensity to buy"). In addition, ML models may identify or assist in identifying keywords, trending topics, articles and documents relevant to a conversation, and similar transcripts. ML models may forecast or assist in forecasting call volume or other anomalous call patterns, as well as help populate call summaries and/or call memoranda.

A conversation between the caller and the agent may have one or more topics such as greetings, basic fact gathering, call purpose determination, billing issues, service issues, device issues and any suitable classification for associating the conversation or conversation portion with a useful and/or helpful action that the agent is able to perform. Although conversations can vary widely, there may be a relatively small number of topics which are most frequent and/or take up most call time. There may be one or more ML models 202 configured to detect each topic of interest, for example the topics that are most frequent and/or take up most call time. Alternatively, or in addition, there may be a single ML model configured to classify a conversation or conversation portion as belonging to one or more topics in a predefined set of topics. An ability to detect topic changes or a change or shift in the conversation between the caller and the agent from one topic to another can improve an overall accuracy of topic detection, for example, by providing a "conversation steady" signal and/or a "conversation changing" signal as an input to a topic detection ML model.

Calls may be recorded and be associated with agent actions and various outcomes. There may be a substantial historical database or store of such calls and associated data that can be used for training. For example, agent identity may be automatically associated with a call by a facility of the agent desktop and used to train an ML model to identify agent identities. As another example, manually identified call facts and/or conversation topics may be used to train ML models to automatically identify facts and/or topics. In some implementations, the agent may confirm and/or update facts and/or topics identified by the ML models. The confirmed facts/topics and the corresponding call transcription and/or audio to retrain the ML models. Tracked call outcomes such as unsubscribing from a service ("churn events") and purchases of goods and services ("buy events") may be used to train ML models to determine corresponding propensities. Training data may be based on any suitable customer and/or prospect activity including with respect to service experience, website, voice, messaging, in-person retail and/or smartphone 'app' activity, as well as with respect to targeted media (e.g., advertisements) and social media. Training data may be drawn from one or more billing systems, service network level events (e.g., telecommunications network events), financial systems, and customer relationship management (CRM) systems. In some implementations, some customer interactions may be excluded from the training data. These interactions may include profanity, calls that are unrelated to the service provided by the agent's employer, and other similarly unrelated calls. In some implementations, an agent may, at the conclusion of the call, flag it for possible exclusion from the training data.

Trained ML models may provide output as a RESTful service (e.g., a service conforming to a representational state transfer or REST style software architecture) with well-defined programmatic interfaces for use by other system components such as microapps. Outputs of trained ML models may be updated in real-time, corresponding to in-progress calls. Any suitable type of ML model be used. ML models may use supervised and unsupervised learning, as well as federated learning. ML models may include classifiers, Bayesian networks, decision trees, regression analysis, support vector machines, artificial neural networks and genetic algorithms.

An orchestration module 204 may coordinate training and retraining of ML models. Retraining may be periodic, manually triggered or triggered according to one or more performance criteria. For example, agents and/or other system users may provide feedback with respect to ML model output and increasing levels and/or rates of correction may trigger retraining. The orchestration module may further coordinate publication and/or retirement of retrained ML models. In accordance with at least one embodiment, there may be multiple versions and/or variations of particular ML models. For example, an ML model may be trained with different training data sets, use different sets of inputs and/or use different model types. The orchestration module may provide A/B testing capability for the multiple versions. For example, the orchestration module may publish multiple versions of an ML model, randomly select between the versions for new calls and monitor one or more performance criteria with respect to the different versions. In accordance with at least one embodiment, the orchestration module may automatically promote a ML model under test to be the selected production ML model based on the performance criteria. For example, the performance criteria may include feedback levels and/or rates, as well as correlation with agent goal achievement.

The social and messaging product development distributed event streaming 208 may be configured to receive data from various sources. These sources may include service experience 222, web and retail applications 228, and media targeting information 230. These three sources may provide data related to the customer and/or the prospective activity of the customer. The social and messaging product development distributed event streaming 208 may also receive conversation content and agent related data that includes voice, social, and messaging data 220.

The social and messaging product development distributed event streaming 208 may use the transformer 206 to access the ML model 202. The social and messaging product development distributed event streaming 208 may receive an output from the ML model 202 and provide the results to the expert assist engine 218, the contact center assist for BOC and NRP 216, and/or a short term storage 212. The short term storage 212 may provide data to the client 214 that has data needs that are not conductive to streaming.

Figure 3:
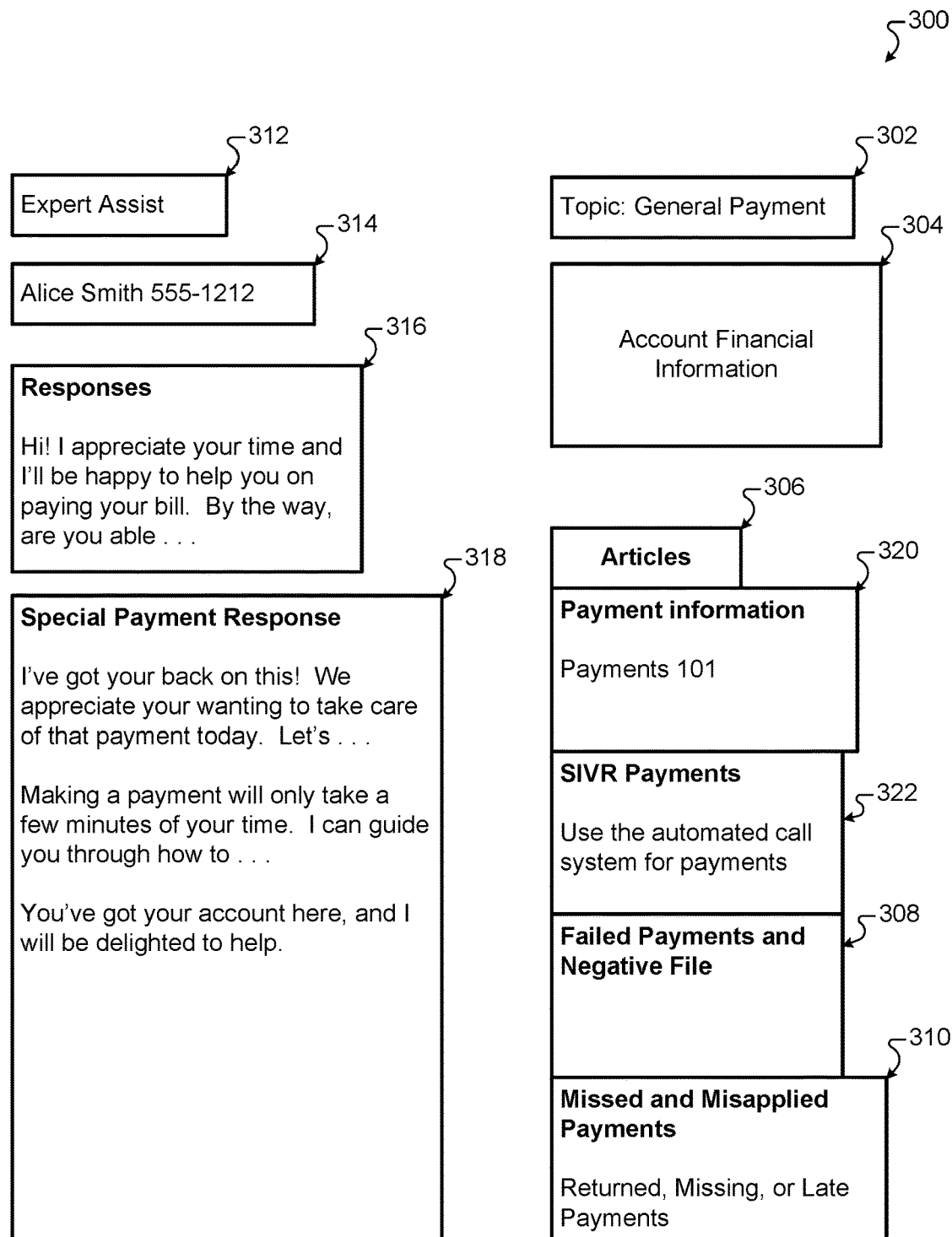
FIG. 3 is a user interface diagram illustrating aspects of an example graphical user interface in accordance with at least one embodiment.

The social and messaging product development distributed event streaming 208 may provide various inputs and results of the ML models 202 to the orchestration module 204 and the long term storage 224. The long term storage 224 may provide training data to the ML training pipeline 226. The orchestration module 204 may use the data from the social and messaging product development distributed event streaming 208 to publish new ML models. Output of ML models may be used to surface information to an agent in real-time that assists the agent in achieving call goals. FIG. 3 depicts aspects of an example graphical user interface 300 (GUI) in accordance with at least one embodiment. For example, the GUI may be a microapp of the agent desktop. One or more of the published ML models may be applied to the audio and/or transcription stream associated with a current call to determine a current topic of conversation. The example GUI indicates that the current topic is "General Payment."

The output of one or more ML models may be used to determine, in real-time, one or more response options 316 and 318 that are relevant to a call in-progress. For example, one or more of the published ML models may be applied to the audio and/or transcription streams associated with a current call to determine one or more call features (including a current topic of conversation) and, based on the determined call features, one or more portions of historical conversations may be presented to the agent. The example GUI shows four response options 316 and 318 presented including a response option indicated as a "Special Payment Response." Any suitable number of response options may be presented in the GUI. Response options may be ordered by relevance and/or predicted effectiveness in achieving agent goals such as customer satisfaction, first call resolution, goals related to particular conversation topics and/or topic coverage, and revenue goals. For example, conversation portions in historical calls may be scored to indicate or reflect effectiveness (e.g., correlation) with respect to achievement of agent goals based at least in part on call features as determined by the ML models, and conversation portions with optimal (e.g., highest) and/or improved scores can then be associated with call features identified as being similar in the current call based on other ML model scoring similar responses correlated with various inputs. These conversation portions may be presented as the response options. Any suitable relevance and/or scoring system may be used to score historical conversation portions including an ML model trained to optimize for and/or improve effectiveness with respect to achievement of one or more agent goals based at least in part on call features. Relevant agent procedures or customer informational articles 306 may be similarly surfaced. The example GUI shows four relevant articles 320, 322, 308, and 310 being presented to the agent, with particular article portions and/or subsections being emphasized.

In accordance with at least one embodiment, achievement rates for the first call resolution goal (e.g., minimizing a number of calls associated with a same issue and/or customer) can be improved by covering each of a predefined set of topics. Accordingly, a scoring system for surfacing optimal response options may monitor coverage of the predefined set of topics and prompt the agent to progress to uncovered topics of the predefined set of topics at appropriate moments in the conversation, for example, when a topic change is detected and/or when an ML model detects that the call may be progressing to a close without covering one or more of the predefined set of topics. For example, the scoring system may prompt the agent at least in part by scoring conversation portions associated with uncovered topics more highly.

In some instances, the expert assist tool may provide suggestions to the agent in response to detecting a change in topic. For example, a sample response may suggest that the agent verify that the caller is satisfied with the status of the previous issue. This may help ensure that the problem is resolved and/or that the customer is ready to move on to another issues. In other instances, the expert assist tool may identify other issues that may provide suggested topics. For example, if the caller has a balance on the account, then the tool may suggest transitioning to payment options if a topic change is detected. In some instances, a ML model may be trained to detect a topic change using previous conversations that include labels that identify a topic change. These labels may be independent of the topic. In some instances, the expert assist tool may detect a topic change by monitoring the output of the ML model configured to identify the topic of the conversation. In some instances, the expert assist tool may identify a topic change using a rules-based approach. This approach may identify keywords in the transcription to determine a likely topic change. These keywords can include words and phrases that suggest satisfaction/resolution, transition phrases, change in frequency of keywords (e.g., words relating to devices decrease, words relating to billing/payment increase), and/or other similar keywords.

The agent may interaction with another GUI that may show much more customer information collected from various customer information systems such as one or more billing systems, as well as two action suggestions that are based on customer information (e.g., customer tenure and account deposit details). The GUI also presents "Conversations Last 7 Days," with each such conversation having a summary window that indicates call length, agent that handled the call, type of call (e.g., voice, messaging, social), one or more topics associated with the conversation, as well as a general topic associated with the call, and a link to view the transcript of the call. In accordance with at least one embodiment, the ML models may provide, or assist with providing, at least the identity of the agent that handled the call, the one or more topics associated with the conversation, as well as the general topic associated with the call. In instances where the agent is talking with a customer over a voice call, the recommended responses interface may be replaced. If an agent is conducting a messaging conversation with a customer, then the agent may select one of the recommended responses to output the message to the current conversation. If an agent is conducting a voice conversation, then the agent may not be able to select a recommended response and have the system speak the suggestion in the agent's voice. Instead, the recommended responses interface may be replaced with suggested talking points. Selecting a suggested talking point may cause the interface to display a more detailed transcription for the agent to read.

Figure 4:
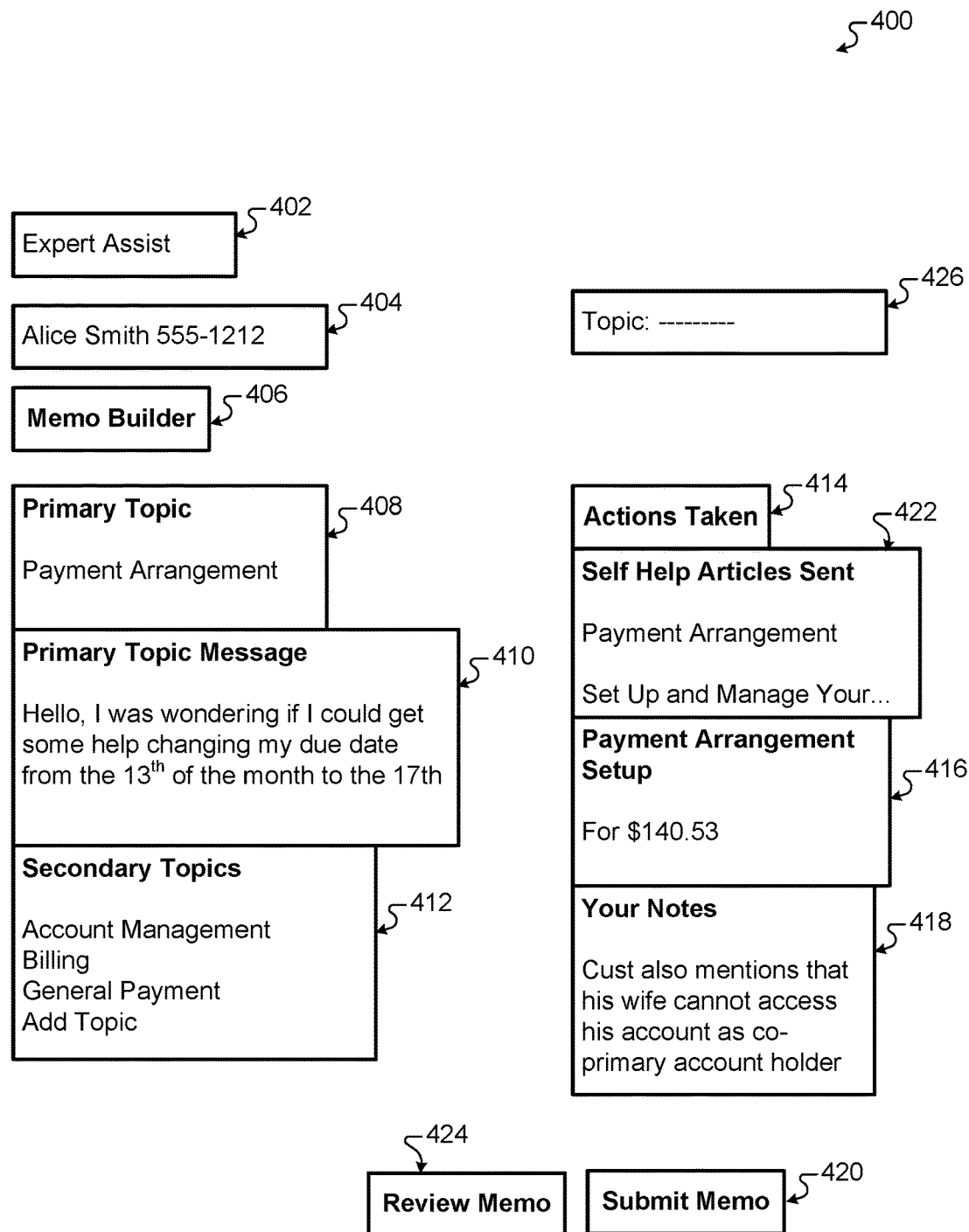
FIG. 4 is a user interface diagram illustrating further aspects of the example graphical user interface in accordance with at least one embodiment.

In accordance with at least one embodiment, output of the ML models may be used to create an automated summary and/or memorandum of a call. FIG. 4 depicts an example GUI 400 for automated memorandum creation in accordance with at least one embodiment. The example GUI 400 includes a primary topic 408 as well as a component 412 for identifying secondary topics. The primary and secondary conversation topics 408 and 412 may be identified with the assistance of ML models as described above. The example GUI further includes a primary topic message 410. The primary topic message 410 may correspond to a conversation portion identified and/or scored as most relevant and/or important with respect to the conversation topics, particularly the primary topic, and/or agent goal achievement. The example GUI further includes an actions 414, 422, 426, and 418 taken component identifying actions taken by the agent during the call, and a "How did Memo Builder do?" feedback mechanism with adjacent thumbs up/thumbs down buttons for providing feedback signals used to train and/or retrain associated ML models.

In accordance with at least one embodiment, an expert assist tool (e.g., a microapp on the agent desktop) provides agents with clickless-context about customers as well as real-time insights and recommendations. In accordance with at least one embodiment, providing relevant contextual information about customers without a need to 'click through' ("clickless-context") can save call time and improve the customer's experience. Real time transcription of conversations allows for the automation of repetitive tasks, a richer view of interaction history, and the ability to monitor and right-course teams "just-in-time" to drive key performance indicator (KPI) improvements.

In accordance with at least one embodiment, memoranda leave breadcrumbs on an account, but the complete story of an interaction may be automated in some instances and packaged up for future viewing and understanding by an agent who may subsequently conduct a service call with the same caller or callers with a similar problem. Features may include automated interaction summaries and storing of actions with a paired down transcript. Such automation can save significant time per call. An agent can enter a memoranda of a call based on the agent's experience with the caller. The memoranda may include the caller's problem and how the agent solved the problem. These summaries may be in addition to the details that the expert assist tool generates automatically. For example, a caller may have had the problem of a slow connection with the network, and the agent solved the problem by determining that the caller was using old equipment. The agent may write a memoranda of "caller had slow connection, recommended upgrading equipment." The expert assist tool may include additional details related to the caller have a problem of a slow connection. This may provide a more complete story of the call. The tool may indicate other possible solutions that were not the problem such as determining that the caller's account was paid up, determining that the caller's equipment had a reliable connection to the network, determining that the caller's had the appropriate service plan, and other possible causes of a slow connection. This record may assist agents in the future to identify likely problems if the caller calls again with a similar or unrelated problem. Knowing that the caller typically has a reliable connection may help an agent in the future identify the cause of a problem. The tool may also note the disposition of the caller during the call which may assist future agents with what to anticipate from the caller. The future agent may adjust the agent's initial social banter that the agent says based on the disposition.

Agents may interact with another GUI that presents an example automated summary including a topic, and one or more "Conversation Snippets." The topic may be identified with the assistance of ML models as described above. The conversation snippets may correspond to conversation portions identified and/or scored as most relevant and/or important with respect to the topic and/or agent goal achievement.

In accordance with at least one embodiment, agents may dig through streams of memoranda to get context on a conversation. Using ML models, we can filter out the noise to only show pertinent interaction summaries. The noise may include social banter and other niceties. In some implementations, an ML model or a rules-based processing approach may be used to process the social banter and provide topics that may be of interest to the caller. For example, the caller may have an affinity for cats, sports, hiking, gardening, etc. These interests may be stored and presented to future agents. These may be useful for cross-selling related services and/or providing suggested topics to help stabilize a tense call. Features may include an omnichannel view (e.g., with respect to voice, messaging and social media), double-click into full transcripts, a clearer view of agent goal impacts, and a reduction in how much customers have to repeat themselves over the course of multiple interactions. The agent may interface with yet another GUI that presents an example conversational context including a topic, and one or more conversation portions. The topic may be identified with the assistance of ML models as described above. The conversation portions may correspond to portions identified and/or scored as most relevant and/or important with respect to the topic and/or agent goal achievement.

Example Network Architecture

Figure 5:
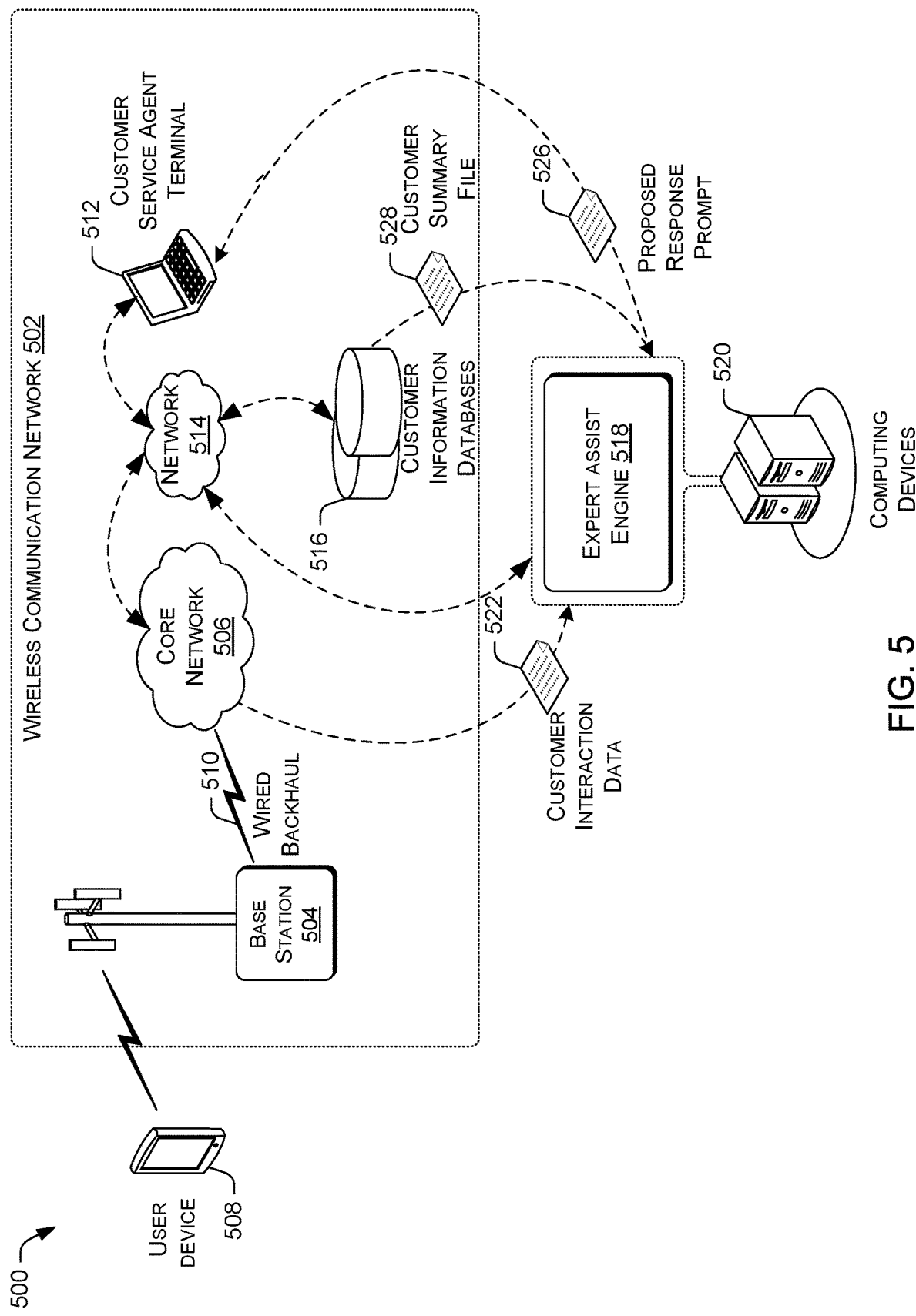
FIG. 5 is a schematic diagram illustrating aspects of an example computer systems architecture in accordance with at least one embodiment.

FIG. 5 depicts aspects of an example computer systems architecture in accordance with at least one embodiment. The wireless carrier may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), Fifth Generation (5G), and/or so forth.

The network architecture 500 of a wireless carrier may include a wireless communication network, such as wireless communication network 502, which may consist of base station nodes, such as the base station node 504, and a core network 506. The base station node 504 is responsible for handling voice and data traffic between user devices, such as user device 508, and the core network 506 via air interfaces. The base station node 504 may be connected to the core network 506 via a wired backhaul 510. However, the base station node 504 may have no wired backhaul connection with the core network 506. The base station node 504 may be equipped with wireless communication equipment for the wireless exchange of communication data between the network nodes. In some embodiments, the wireless communication equipment may be microwave communication equipment. The user device 508 may embody or include a smartphone, a tablet computer, an embedded computer system, or any other device that is capable of using the wireless communication services that are provided by the wireless carrier network. The core network 506 may include components that support data traffic, voice traffic.

Additionally, the wireless communication network 502, may contain a customer service agent terminal 512. The customer service agent terminal may include a general computer or any other computing device that can receive input and data, process the input and data, and generate output data including the agent desktop. The customer service agent terminal may be communicatively linked to the core network 106 to send and receive user device 508 voice and data communication via a network 514. The network 514 may include a local area network (LAN), a larger network such a wide area network (WAN), the wireless communication network 102, and/or the Internet.

The customer service terminal 512 may interface with a customer information database 516 via the network 514. The customer information database 516 may contain customer user device information, customer billing information, customer wireless carrier service information, and/or so forth.

The architecture 500 may further include an expert assist engine 518. For example, the expert assist engine 118 may incorporate and/or be incorporated by one or more components shown in FIG. 1 and FIG. 2. The expert assist engine 518 may execute on one or more computing devices 520. The computing devices 520 may include general-purpose computers, such as desktop computers, tablet computers, laptop computers, servers, and so forth, that are capable of receiving inputs, processing the inputs, and generating output data. In various embodiments, a wireless carrier or a third-party entity that is working with the wireless carrier may operate the computing devices 520.

The expert assist engine 518 may receive, via the core network 106, customer interaction data 522, which may be received in the form of a voice and data communication and/or a stream of transcribed text. The user device voice data may be transcribed by the core network 506 or components of the core network 506. The customer interaction data 522 may include real-time data originating from the user device 508. For example, the customer interaction data 522 may be a real-time voice and data communication with the customer service agent terminal 512 and may include a customer query for billing, an inquiry for user devices, a question about the wireless carrier services, and/or so forth. The expert assist engine 518 may use one or more ML models that use the customer interaction data 522.

In an additional embodiment, the expert assist engine 518 may provide a customary summary file 528 that may be transmitted, via the network 514, to the user device account located on the customer information database 516. The customer summary file 528, may contain summary information of the voice and data communication between the user device 508 and the customer service agent 512, which may include information extracted using ML models.

Figure 6:
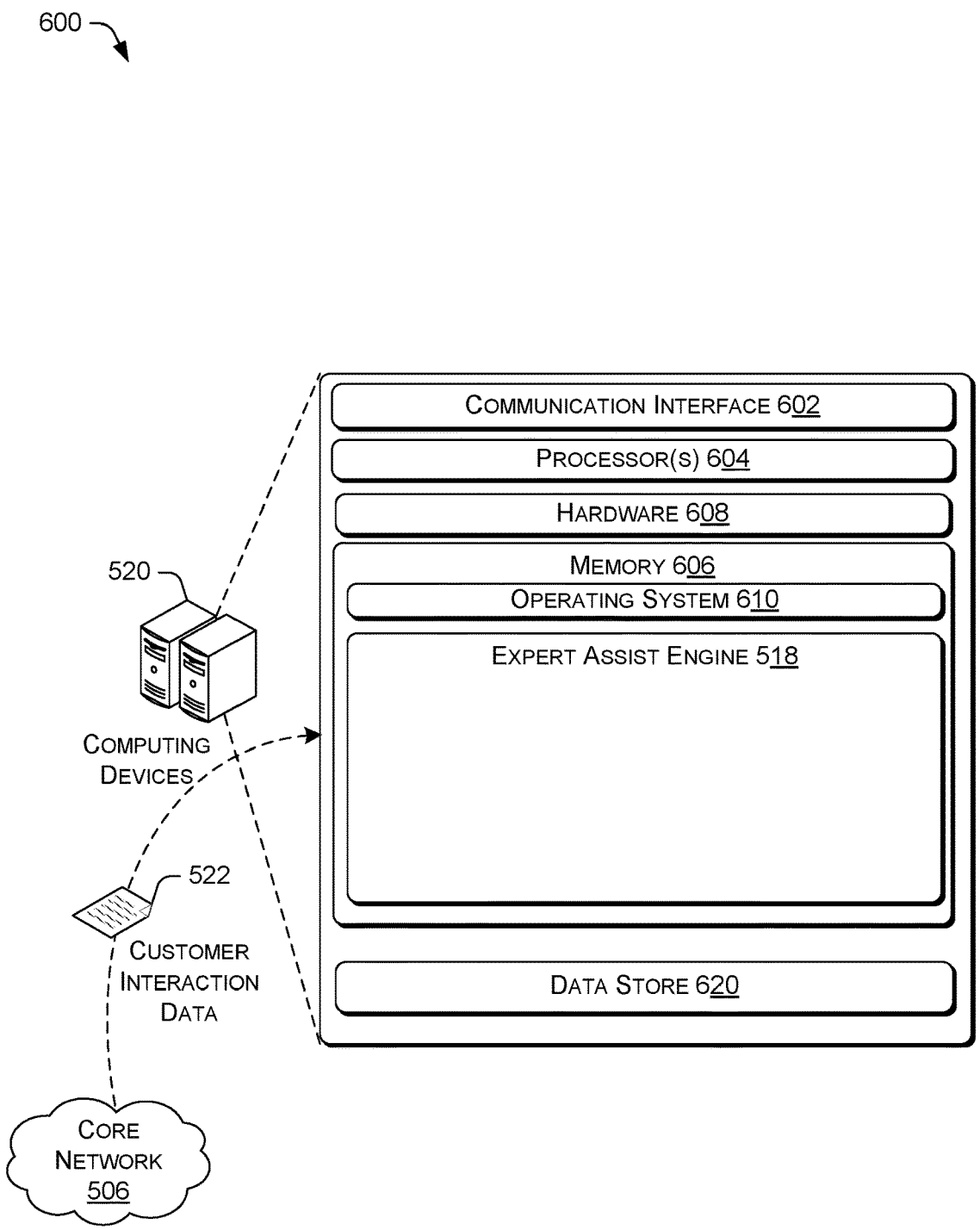
FIG. 6 is a schematic diagram illustrating aspects of an example computer systems architecture in accordance with at least one embodiment.

FIG. 6 depicts aspects of an example computer systems architecture in accordance with at least one embodiment. The expert assist engine 518 may be implemented on one or more computing devices 1 520. The computing devices 520 may be a part of a radio access network, a core network, or a virtual private network (VPN). Alternatively, the computing devices 520 may be operated by a third-party service provider that is distinct from the wireless carrier. The computing devices 520 may include general purpose computers, servers, or other electronic devices that are capable of receiving inputs, process the inputs, and generate output data. In other embodiments, the computing devices 520 may be virtual computing devices in the form of virtual machines or software containers that are hosted in a cloud.

The computing devices 520 may include a communication interface 202, one or more processors 204, memory 206, and hardware 208. The communication interface 202 may include wireless and/or wired communication components that enable the computing devices to transmit data to and receive data from other networked devices via the wireless communication network 102 and/or an additional network. For example, the additional network may be local area network (LAN), a larger network such as a wide area network (WAN), or a collection of networks, such as the Internet. The device hardware 208 may include additional hardware that performs user interface, data display, data communication, data storage, and/or other server functions.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital storage disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 604 and the memory 606 of the computing devices 1 520 may implement an operating system 610 and the expert assist engine 1 518. The operating system 610 may include components that enable the computing devices 1 520 to receive and transmit data via various interfaces (e.g., user controls, communication interface, and/or memory input/output devices), as well as process data using the processors 604 to generate output. The operating system 610 may include a presentation component that presents the output (e.g., displays the data on an electronic display, stores store the data in memory, transmits the data to another electronic device, etc.). Additionally, the operating system 610 may include other components that perform various additional functions generally associated with an operating system. The memory 606 may further contain a data store 620.

The expert assist engine 518 may include various modules. These modules may include routines, program instructions, objects, and/or data structures that perform particular tasks or implement particular abstract data types. The expert assist engine 518 may check and perform retrieval based on configurable policies. For example, a configurable policy may specify the source data location, frequency of data retrieval, data retention period, and data disposal date/time. In various embodiments, expert assist engine 518 may employ data adapters to obtain data files from the data sources. The data adapters may use file transfer protocol (FTP), Hypertext Transfer Protocol (HTTP) posts, direct network infrastructure element connection, and/or other data transfer protocols to retrieve the data files from the data sources. The data may be in the form of JavaScript Object Notation (JSON) records, Structured Query Language (SQL) records, and/or so forth.

In some embodiments, the expert assist engine 518 may perform data integrity tests to verify the integrity of the received data and may further merge data from multiple data files, such that the merged data may be fed into other modules for analysis.

In various embodiments, the expert assist engine 518 may retrieve customer account data from the customer information database 516. The customer account data may include customer account information for the user device 108 that is communicatively connected with the customer service agent terminal 512. The customer account data may include billing information, wireless carrier service level, user device information, data use, and/or so forth. The expert assist engine 518 may further retrieve customer communication data, which may include real-time voice and data communication between the user device 108 and the customer service agent terminal 512.

A user may interact with the expert assist engine via user interface controls. The user interface controls may include a data output device (e.g., visual display, audio speakers), and one or more data input devices. The data input devices may include, but are not limited to, combinations of one or more keypads, keyboards, mouse devices, touch screens that accept gestures, microphones, voice or speech recognition devices, and any other suitable devices or other electronic/software selection methods. Accordingly, the user may input topic model data for associated voice and data communication, configure proposed response prompts, and/or so forth.

The data store 220 may store data that are processed or generated by the expert assist engine 518. The data store 220 may include one or more databases, such as relational databases, object databases, object-relational databases, and/or key-value databases that store data. For example, data stored in the data store may include topic models, proposed response prompts, and/or so forth.

Figure 7:
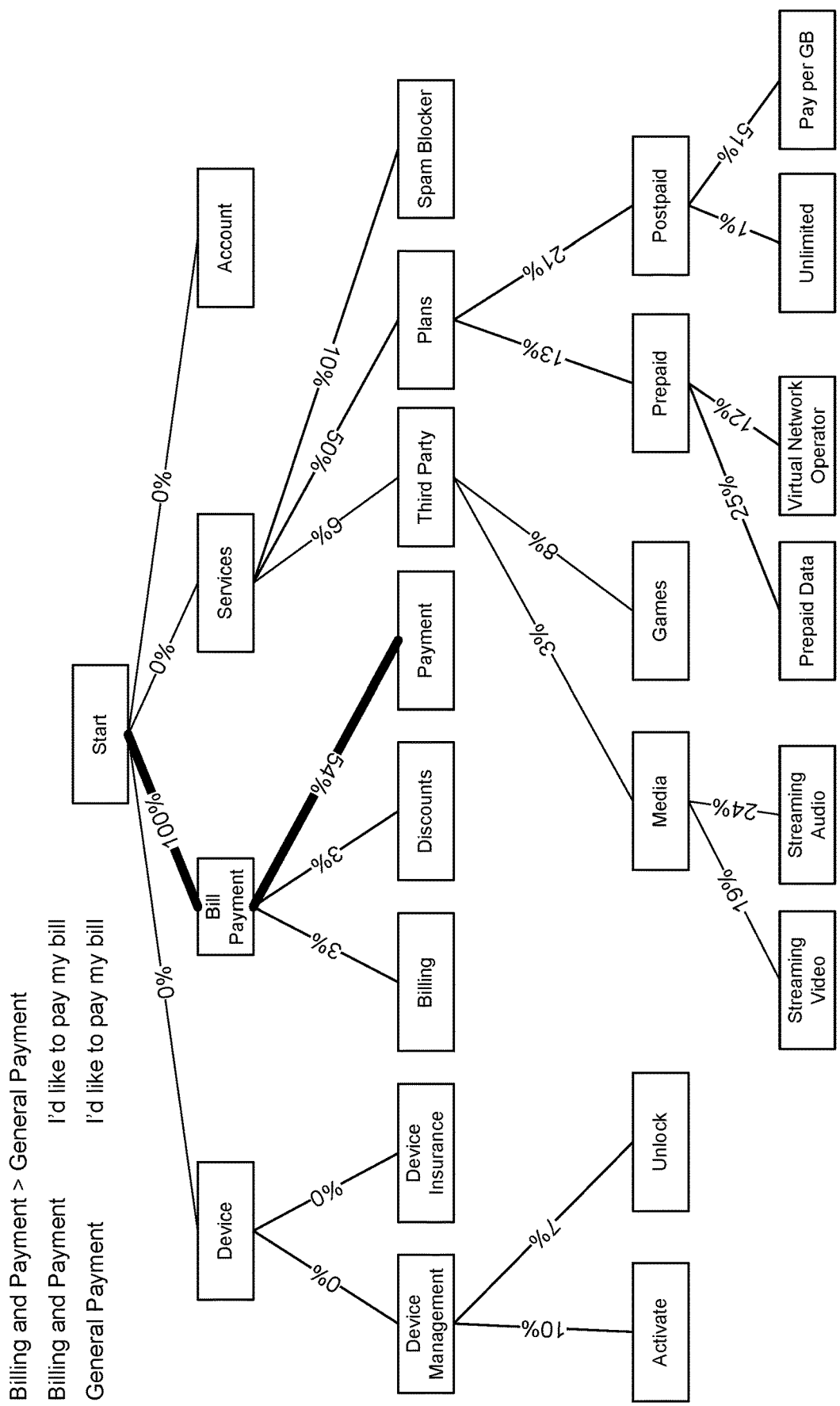
FIG. 7 is a diagram illustrating an example topic category tree in accordance with at least one embodiment.

FIG. 7 is a diagram illustrating an example topic category tree in accordance with at least one embodiment. This topic category tree may represent a decision process of an architecture, for example, the architecture of FIG. 1, in determining a topic of the call or a portion of the call between the caller and the agent. The architecture may use a topic category tree to limit the amount of computing processing power that is involved in determining a topic. In some instances, determining a topic for the conversation can involve multiple ML models. By using a topic category tree, the architecture may only execute those ML models and/or execute processes that are most likely to identify an accurate topic.

The node at the root of the topic category tree may be related to determining the high level topic of the conversation. The node may represent an ML model or another process, such as a rules-based process (e.g., searching for a keyword or phrase). This node may be configured to receive a transcription of an utterance and output data indicating a high level topic. In some implementations, the architecture may limit the transcriptions provide to this node to transcriptions of complete utterances. Based on the output of this node, the architecture may provide the transcription as an input to another node configured to identify subtopics.

In some implementations, the root node may represent an ML model configured to identify high level topics such as network issues, service issues, and/or billing issues. The training data for this model may include transcriptions that are each labeled with a topic. The architecture may select the node of the topic category tree from the next level of the tree based on the output from the root node. For example, if the root node outputs that the transcription is related to network issues, then the next node may be related to identifying subtopics of network issues. If the root node determines that the transcription is related to billing issues, then the next level node may be related to identifying subtopics of billing issues. The topic category tree may include additional levels as needed.

In the example shown in FIG. 7, the transcription is "I'd like to pay my bill." The architecture may receive information that this transcription is for a complete utterance and provide the transcription to the importance model. The importance model may output an importance score. Based on that importance score satisfying a threshold importance score, the architecture may provide the transcription to the root node of the topic model tree. The root node may determine that the most relevant topic is billing. Based on the topic of billing, the architecture may select a node from the next level of node. The next level node may receive the transcription and determine that the subtopic is general payment. The microapps that subscribe to the outputs of these nodes may receive the identified subtopic and update the agent-facing interface. Additionally, or alternatively, other ML models may subscribe to the output of these nodes. For example, an ML model that is configured to output a suggested talking point and/or suggested scripts may receive the identified subtopic. This ML model may output a suggested talking point to address the customer's concerns related to paying the bill.

Figure 8:
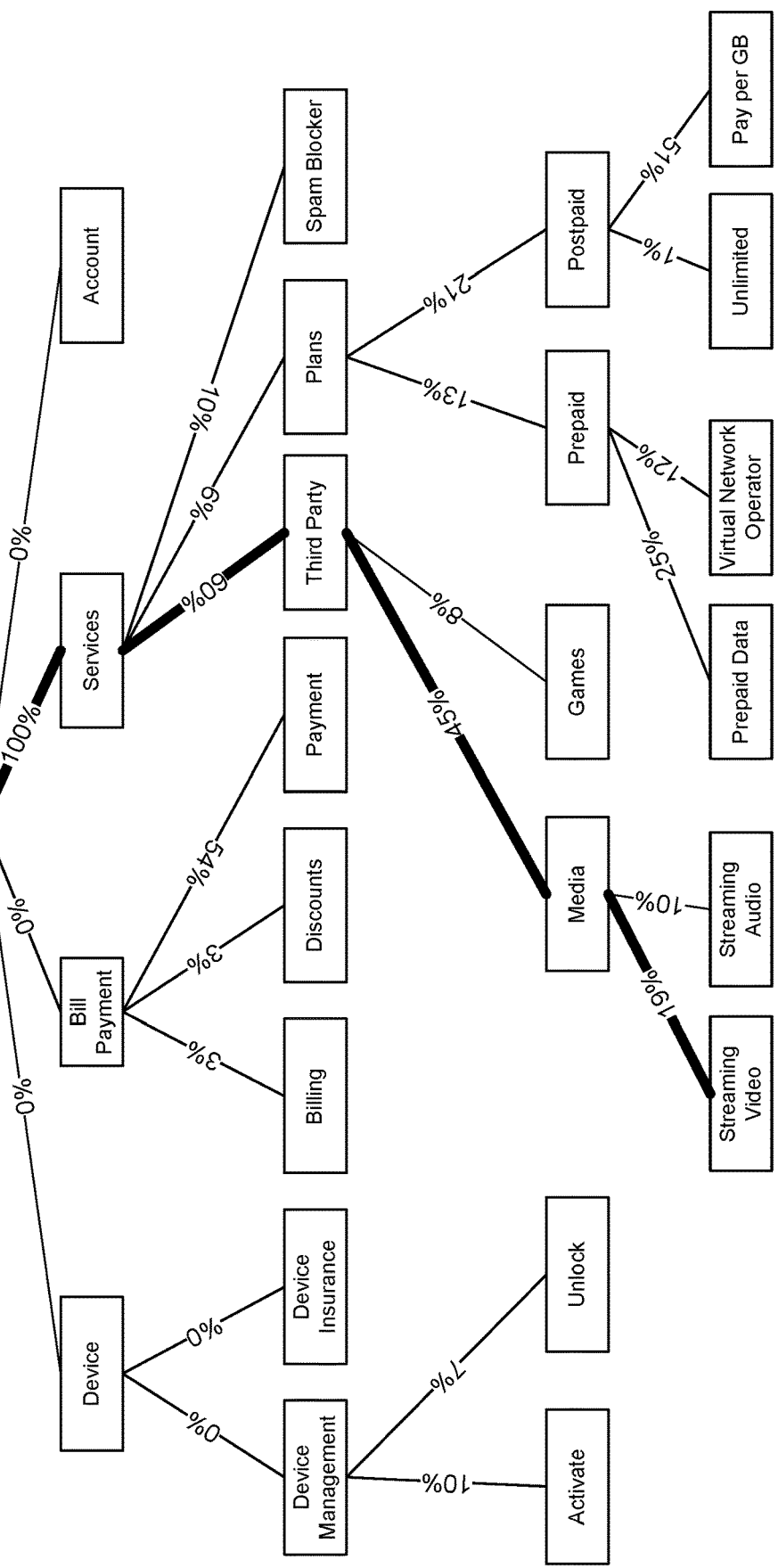
FIG. 8 is a diagram illustrating another example topic category tree in accordance with at least one embodiment.

FIG. 8 is a diagram illustrating another example topic category tree in accordance with at least one embodiment. The topic category tree may be similar to the topic category tree in FIG. 7 and may analyze the example transcription, "how do I get netflix." The importance model may receive this transcription and output an importance score. Based on the importance score satisfying a threshold, the architecture may provide the transcription to the root node of the topic category tree. The root node may determine that the relevant topics are plans and services. The architecture may select, from the next level of nodes, a node based on the plans and services topic. The next level node receives the transcription and determines that the transcription is further related to services and features. The architecture continues this process of selecting additional nodes based on the output of the previous node and determines that the transcription is also related to media and entertainment and Netflix. The microapps and/or ML models that subscribe to the output of the topic category tree may receive the output and update the agent-facing interface. The updated agent-facing interface may include suggested talking points and/or suggested scripts to address the customer's concerns related to getting access to Netflix.

In some implementations, the architecture may use each node to determine a likely topic. In this case, the architecture may determine the path along the tree with the most likely topics and subtopics. This technique may ensure that the most accurate topics are identified, but may sacrifice speed and computing resources. In some implementations, the architecture may select the node at each level that received the highest score from the parent node. This technique may be faster and use fewer computing resources, but in some instances, it may not identify the most accurate topics.

Figure 9:
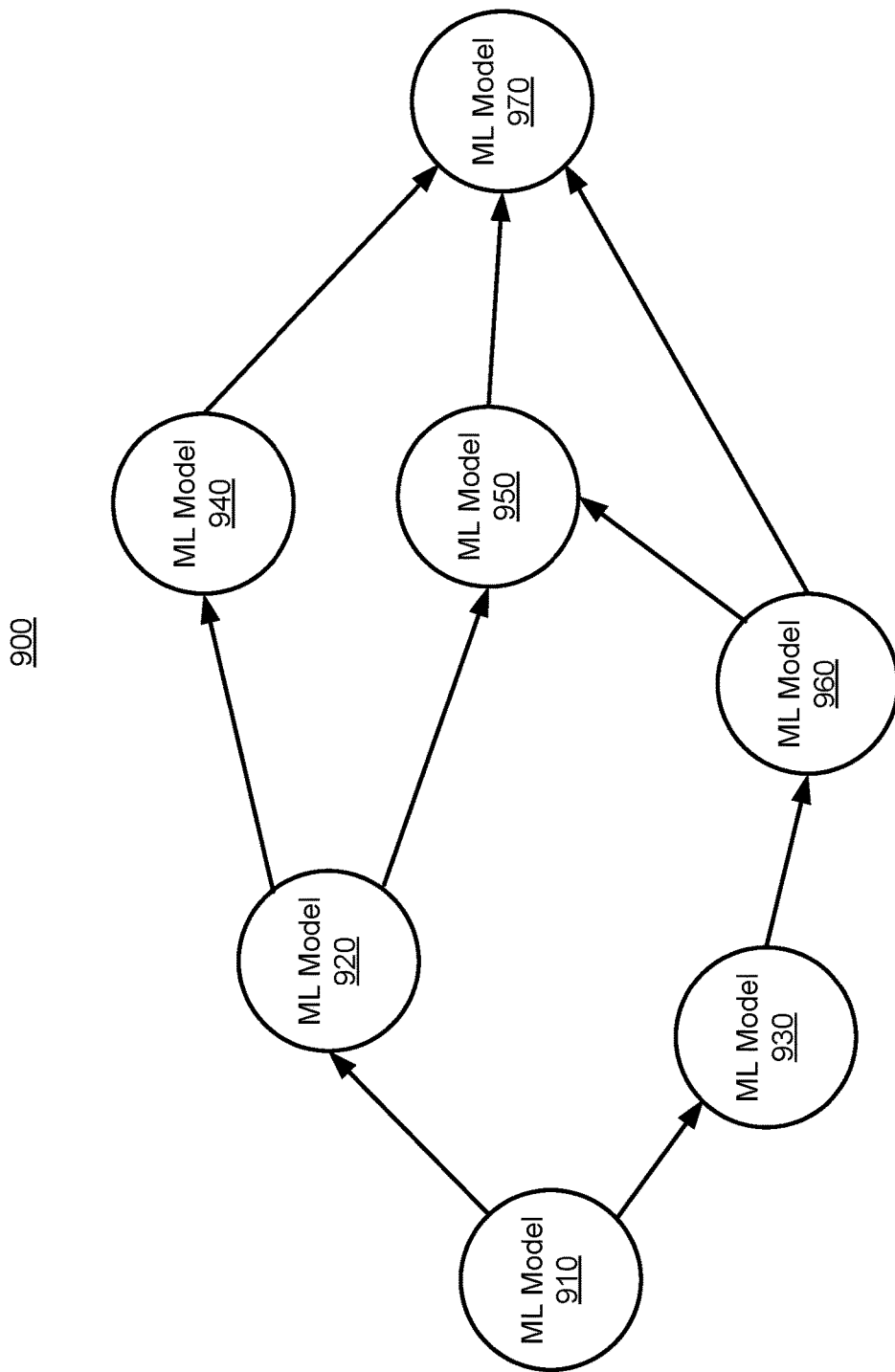
FIG. 9 is a diagram illustrating an example directed acyclic graph of machine learning models in accordance with at least one embodiment.

FIG. 9 is a diagram illustrating an example directed acyclic graph 900 of machine learning models in accordance with at least one embodiment. The directed acyclic graph 900 may represent the conceptual relationship of the ML models in the architecture of FIG. 1. The ML model 910 may represent the first model to receive the transcription. The output of the ML model 910 may be an input to the ML model 920 and the ML model 930 and so on. While the directed acyclic graph 900 may only include seven ML models, the architecture may include or be able to access more or less ML models.

Some of the ML models may be configured to detect, identify and/or classify call features such as an identity of an agent participating in a call, determine demographic features of a caller, determine an initial call reason, determine a fact in a conversation or conversation portion, determine the propensity of a caller to unsubscribe from a service ("propensity to churn"), and determine the propensity of a caller to purchase a good or service ("propensity to buy"). Additional ML models may be configured to identify or assist in identifying keywords, trending topics, articles and documents relevant to a conversation, and similar transcripts. Other ML models may forecast or assist in forecasting call volume or other anomalous call patterns, as well as help populate call summaries and/or call memoranda. Each of these ML models may be located at a different node of the directed acyclic graph 900 and may receive input from the output of another ML model.

In some implementations, some of the ML models may not be used during a conversation between an agent and a caller. For example, the ML model 910 may be the importance model that is configured to output an importance score. The ML model 920 and the ML model 930 may each have a different threshold for the importance score. If the importance score is 0.4, the threshold for ML model 920 is 0.5 and the threshold for ML model 930 is 0.3, then the ML model 920 may be inactive and the ML model 930 may be active. Based on the example graph 900, ML model 940 will not be active. By limiting the number of active ML models in each conversation, the expert assist tool may prevent the usage of excessive computing resources.

Figure 10:
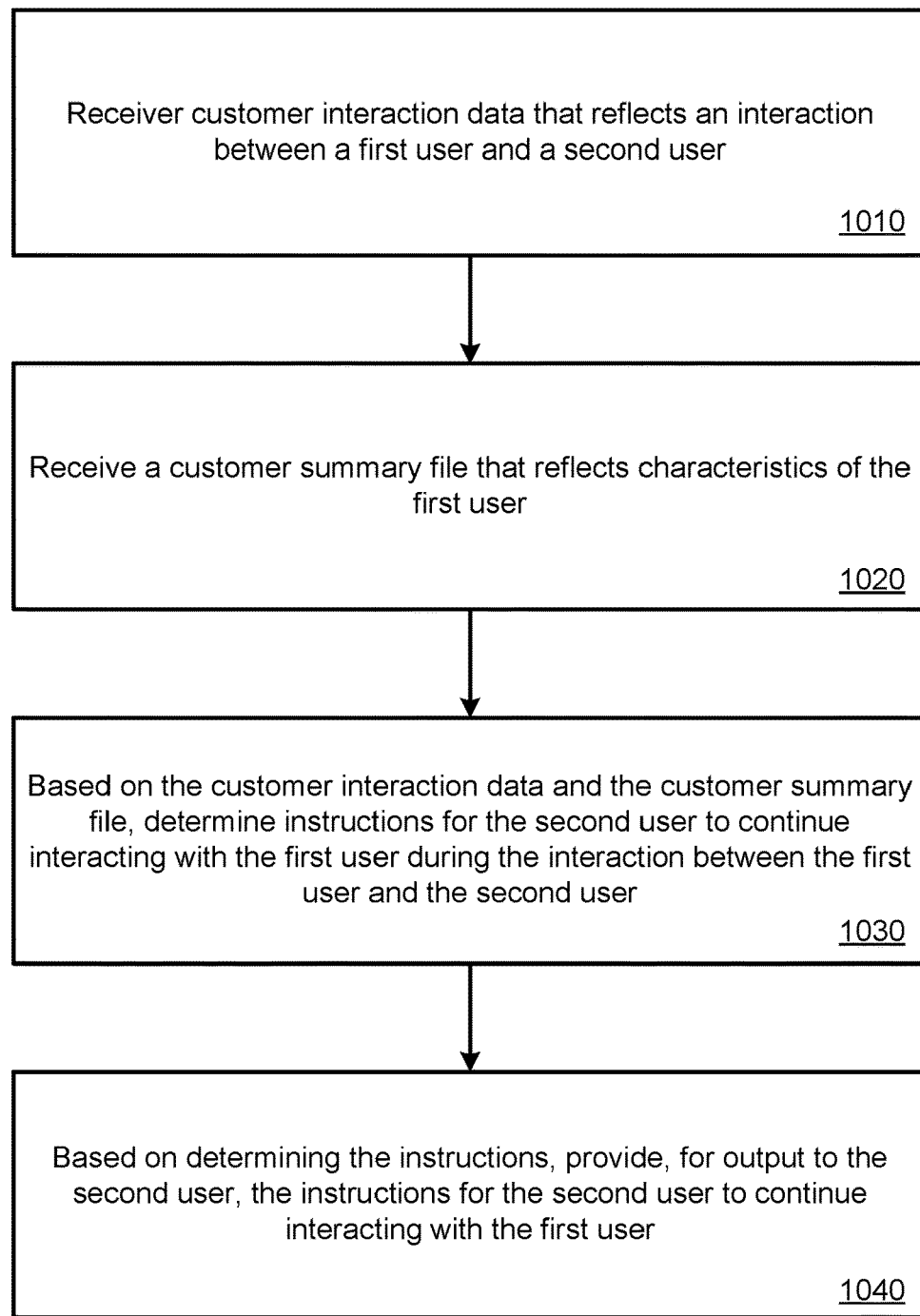
FIGS. 10 and 11 are flowcharts of example processes for providing assistance to customer service agents.

FIG. 10 is a flowchart of an example process 1000 for providing assistance to customer service agents. In general, the process 1000 monitors an interaction between a first user and a second user. The process 1000 receives customer interaction data and a customer summary file. Based on the customer interaction data and the customer service file, the process 1300 determines and outputs instructions for the second user to continue the interaction with the first user. The process 1000 will be described as being performed by the computing devices 520 of FIG. 5 or FIG. 6 and will include references to other components in FIG. 5. In some implementations, the process 1000 may be performed by a combination of other components of FIG. 5 such as the customer service agent terminal 512, the wireless communication network 502, and/or the user device 508.

The computing devices 520 receive customer interaction data 522 that reflects an interaction between a first user and a second user (1010). In some implementations, the first user is a customer of a wireless carrier and the second user is a customer service representative of the wireless carrier. The first user and the second user may be interacting through an audio interface, a text interface, a video interface, and/or any other type of interface. The audio interface may be voice based communications, such as a telephone call. The text interface may be text based communications, such as text messaging or chatting. The video interface may be video based communications, such as a video call.

In some implementations, the customer interaction data 522 may include transcriptions of the speech of the first user and the second user. In some implementations, the customer interaction data 522 may include audio of the speech of the first user and the second user. In some implementations, the customer interaction data 522 may include the messages exchanged between the first user and the second user. In some implementations, the customer interaction data 522 may include video of the first user and/or the second user that was captured during the interaction.

In the case of the customer interaction data 522 including audio of the speech of the first user and the second user, the computing devices 520 may receive two audio streams. One audio stream may be audio of the speech of the first user, and another audio stream may be audio of the speech of the second user. In some instances, the audio streams may not be labeled. In this case, the computing devices 520 may perform speech recognition on the audio streams. The computing devices 520 may analyze the transcriptions to determine which audio stream corresponds to the first user and second user. The computing devices 520 may search the transcriptions for keywords that indicate the corresponding audio streams belong to the first user or the second user. For example, the computing devices 520 may identify the phrase "how can I help you." That phrase may indicate that the corresponding audio stream belongs to the second user who is the customer service representative of the wireless carrier.

In some implementations, the computing devices 520 may use models trained using machine learning to determine which audio stream corresponds to the first user and the second user. The computing devices 520 may use samples that include audio streams and/or transcriptions of those audio streams from previous interactions between various users. The interactions may be in a similar situation, such as interactions between a customer of a wireless carrier and a customer service agent. The audio streams may be labeled as corresponding to the customer or the agent. The computing devices 520 may generate data samples that include an audio stream and/or transcription labeled as corresponding to the customer and an audio stream and/or transcription from the same interaction labeled as corresponding to the agent. The computing devices 520 may train a model using the data samples. The model may be configured to receive a pair of audio streams and/or transcriptions and output data identifying which corresponds to the customer and the agent.

The computing devices 520 receive a customer summary file 528 that reflects characteristics of the first user (1020). In some implementations, the customer summary file 528 may include data identifying a type of device of the first user, wireless carrier service level information, data of previous interactions between the first user and additional users. The data identifying a type of device of the first user may indicate the model of the computing device that the first user uses to communicate with the wireless network. The computing device may be a mobile phone, tablet, smart watch, laptop computer, desktop computer, or any other similar device. The data identifying a type of device may also indicate an international mobile equipment identity, phone number, international mobile subscriber identity, media access control address, and/or any other similar information. The wireless carrier service level information may indicate a subscriber plan for the first user. Some examples, may include an amount of data included in the monthly plan of the first user, additional computing devices and/or uses included in the account of the first user, data usage from previous billing periods and the current billing period, and/or any other similar information. The data of previous interactions between the first user and additional users may include summaries of interactions between the customer and other agents. The summaries may be textual summaries written by the agent participating in the interaction or automatically generated.

Based on the customer interaction data and the customer summary file, the computing devices 520 determine instructions for the second user to continue interacting with the first user during the interaction between the first user and the second user (1030). The instructions may specify how to the second user should respond to first user. This may be helpful in a customer service situation where the first user is the customer, and the second user is the customer service agent. The instructions may provide a script for the second user to speak to the first user, one or more topics to include in a statement or question to the first user, items of data that the second user should request from the first user, a concession that the second user should offer to the first user, an offer for the first user, and/or any other similar instructions.

In some implementations, the computing devices 520 may provide the customer interaction data and the customer summary file to a model. The model may be configured to identify the instructions based on the customer interaction data and the customer summary file. The model may be trained using machine learning and data samples that include customer interaction data and customer summary files from previous interactions between users. The computing devices 520 may receive preselected previous interactions between users. These preselected previous interactions may be those interactions that other users should model their interactions after. For example, the preselected previous interactions may include interactions where the customer service agent successfully deescalated an interaction with a customer, interactions where the agent provided the customer with the requested information, interactions where the agent upsold the customer, and/or any other similar interactions. The computing devices 520 may receive a customer summary file for the customer of each preselected previous interaction.

The computing devices 520 may generate data samples using the preselected previous interactions and the corresponding customer summary files. The computing devices 520 may generate multiple data samples for each of the preselected previous interactions. For each preselected previous interaction, the computing devices 520 may generate data samples that include a portion of the preselected previous interactions. For example, a first data sample may include a transcription of the first utterance from the agent and the corresponding customer summary file. A second data sample may include a transcription of the first utterance from the agent, a transcription of the first utterance from the customer, a transcription of the second utterance from the agent and the corresponding customer summary file. A third data sample may include a transcription of the first utterance from the agent, a transcription of the first utterance from the customer, a transcription of the second utterance from the agent, a transcription of the second utterance from the customer, a transcription of the third utterance from the agent, and the corresponding customer summary file. The computing devices 520 may continue generating data samples for this interaction up to the end of the interaction. The computing devices 520 may generate additional data samples using the additional preselected previous interactions in a similar manner.

The computing devices 520 may train a model using the data samples and machine learning. The data samples may include labels that indicate which portions of the data sample were similar to inputs of the model and which portion of the data sample was similar to the output of the model. The computing device 520 may identify the most recent utterance of the agent in the data sample as the output and the remaining portions of the data sample as the input. In this way, the trained model may be configured to receive a customer summary file 528 and the customer interaction data 522 up to that point of the interaction. The model may output a script for the agent to speak to the customer.

The computing devices 520 may train additional models using data samples that are similar to the previous data samples in that they include the same portions that are similar to inputs of the model. The portions of the data samples that are similar to the output of the model may include one or more topics of the most recent utterance of the agent, items requested by the agent in the most recent utterance of the agent, a concession offered by the agent to the customer, an offer made by the agent to the customer, and/or any other similar instructions. The computing devices 520 may train the additional models using the groups of data samples that include similar types of outputs. In this way, the computing devices 520 may train multiple models to receive a customer summary file 528 and the customer interaction data 522 up to that point of the interaction. Depending on the training data samples for the model, the model may output a script for the agent to speak to the customer, one or more topics for the agent to touch on in the agent's next utterance, items that the agent should request from the customer, a concession that the agent should make to the customer, or an offer that the agent should present to the customer.

Based on determining the instructions, the computing devices 520 provide, for output to the second user, the instructions for the second user to continue interacting with the first user (1040). In some implementations, the computing devices 520 may generate an interface that presents the instructions to the second user. In some implementations, the computing devices 520 may generate synthesized speech of the instructions and output audio to the second user.

The computing devices 520 may continue to use the models to generate additional instructions as the interaction continues. The computing devices may provide, to the model, the customer summary file 528, the customer interaction data 522 that includes the interactions previously provided to the model, and additional customer interaction data that includes the most recent utterances of the customer and the agent. The model may output additional instructions based on the customer summary file 528 and the customer interaction data 522 that includes the most recent interactions. The computing devices 520 may generate an interface to provide the additional instructions to the agent.

In some implementations, the computing devices 520 may determine that the interaction between the first user and the second user is complete. This may occur if either the first user or the second user hangs up the phone or ends the chat session. The computing devices 520 may generate a summary of the interaction. The summary may be based on the instructions provided to the second user and the customer interaction data 522 of the interaction. The computing devices 520 may generate the summary in a narrative format. In some implementations, the computing devices 520 may provide the summary to the first user. The first user may edit the summary as needed, such as to correct any errors. The computing devices 520 may store the summary in the customer information databases 516. The computing devices 520 may indicate to which customer the summary corresponds. In this case, the customer information data 516 may include the summary in the customer summary file 528 for that customer. The next time that same customer calls, the computing devices 520 may receive the customer summary file 528 that includes that summary and any summaries from other previous interactions with the same customer.

Figure 11:
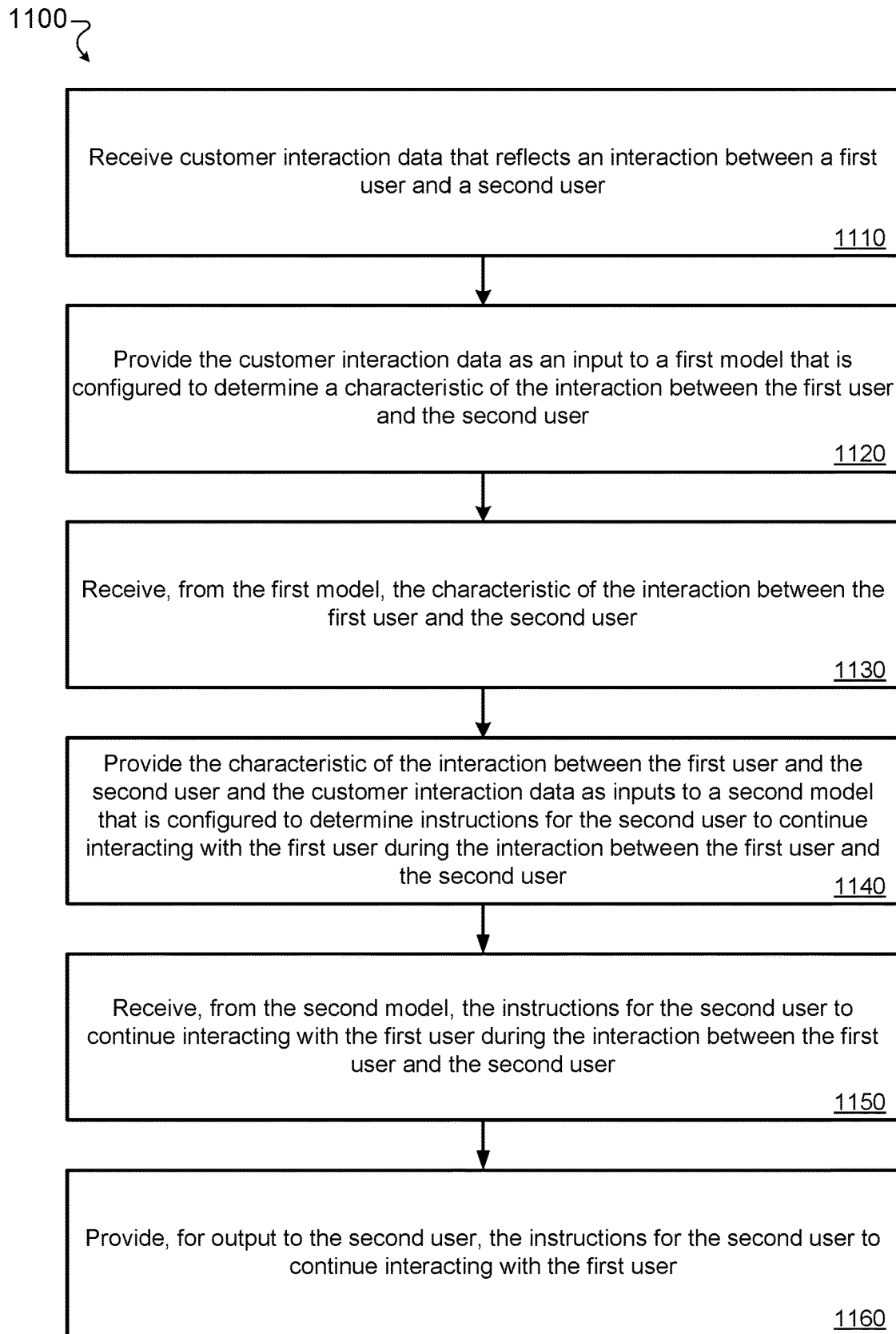

FIG. 11 is a flowchart of an example process 1100 for providing assistance to customer service agents. In general, the process 1100 monitors an interaction between a first user and a second user. The process 1100 receives customer interaction data related to the interaction. Based on the customer interaction data, the process 1100 determines a characteristic of the interaction. Based on the characteristic of the interaction and the customer interaction data, the process 1100 determines and outputs instructions for the second user to continue the interaction with the first user. The process 1100 will be described as being performed by the computing devices 120 of FIG. 5 or FIG. 6 and will include references to other components in FIG. 5. In some implementations, the process 1100 may be performed by a combination of other components of FIG. 5 such as the customer service agent terminal 512, the wireless communication network 502, and/or the user device 508.

The computing devices 520 receive customer interaction data that reflects an interaction between a first user and a second user (1110). In some implementations, the first user is a customer of a wireless carrier and the second user is a customer service representative of the wireless carrier. The first user and the second user may be interacting through an audio interface, a text interface, a video interface, and/or any other type of interface. The audio interface may be voice based communications, such as a telephone call. The text interface may be text based communications, such as text messaging or chatting. The video interface may be video based communications, such as a video call.

In some implementations, the customer interaction data 522 may include transcriptions of the speech of the first user and the second user. In some implementations, the customer interaction data 522 may include audio of the speech of the first user and the second user. In some implementations, the customer interaction data 522 may include the messages exchanged between the first user and the second user. In some implementations, the customer interaction data 522 may include video of the first user and/or the second user that was captured during the interaction.

The computing devices 520 provide the customer interaction data 522 as an input to a first model that is configured to determine a characteristic of the interaction between the first user and the second user (1120). The computing devices 520 receive, from the first model, the characteristic of the interaction between the first user and the second user (1130). In some implementations, the characteristic of the interaction between the first user and the second user may include a determination of which portion of the customer interaction data 522 is attributable to the first user and the second user. In some implementations, the characteristic of the interaction may include demographic features of a first user, an initial reason that the first user requested to interact with the second user or an entity for which the second user works, an identity of the second user, a propensity of the first user to unsubscribe from a serviced offered by the entity, and a propensity of the first user to purchase a good or service from the entity. In some implementations, the characteristic of the interaction may include keywords of the customer interaction data 522, articles or documents related to the customer interaction data 522, transcripts from previous interactions related to the customer interaction data 522, and a summary of the customer interaction data 522. In some implementations, the characteristic of the interaction is a transcription of the interaction if the customer interaction data 522 is audio data.

The first model may be a model trained using machine learning. The computing devices 520 may select a model based on the customer interaction data. For example, if the customer interaction data is audio data, then the computing devices 520 may select a model that is configured to receive audio data. If the customer interaction data 522 is text-based data, then the computing devices 520 may select a model that is configured to receive text-based data.

In some implementations, the computing devices 520 may select a model based on the output of the model. If the computing devices 520 are attempting to determine a characteristic of the interaction that includes the initial reason for the interaction, then the computing devices 520 may select a model that is configured to output the initial reason for the interaction. In some implementations, the computing devices 520 may attempt to determine a characteristic of the interaction that includes which portions of the interaction are attributable to the different users. In this case, the computing devices 520 may select a model that is configured to output data indicating which portions of the interaction are attributable to the different users.

The computing devices 520 may receive instructions to determine a characteristic of the interaction from the second user. For example, the computing devices 520 may receive a request to determine the propensity of the first user to unsubscribe from a serviced offered by the entity. In this case, the computing devices 520 may select a model that is configured to determine the propensity of the first user to unsubscribe from a service offered by the entity based on the type of data included in the customer interaction data 522.

The computing devices 520 may include or access software instructions to determine a characteristic of the interaction from the second user. The instructions may be based on the data that the computing devices 520 already has access to. If the computing devices 520 has access to the information, then the computing device 520 may not select a model to determine that information. For example, the computing devices 520 may access instructions to determine demographic features of a first user and an initial reason that the first user requested to interact with the second user or an entity for which the second user works. In this case, the computing devices 520 may access a model that is configured to output demographic features of a first user and another model that is configured to output an initial reason that the first user requested to interact with the second user.

The computing devices 520 may train the models using machine learning and historical data. The computing devices 520 may generate data samples for training the models using the historical data. The historical data may include previous customer interaction data and previous data that includes characteristics of the interaction such as demographic features of a first user, an initial reason that the first user requested to interact with the second user or an entity for which the second user works, an identity of the second user, a propensity of the first user to unsubscribe from a serviced offered by the entity, and a propensity of the first user to purchase a good or service from the entity. The historical data may also include labels that identify which portion of the customer interaction data is attributable to each user.

The computing devices 520 may generate data samples that include similar types of data. Some data samples may include audio interaction data and demographic features of a first user. Other data samples may include text-based interaction data and demographic features of a first user. Other data samples may include text-based interaction data and a demographic features of a first user. The computing devices 520 may generate multiple groups of data samples that each include different types of data included in the historical data.

The computing devices 520 may train multiple models using the data samples. The resulting model may be configured to receive and output data similar to the type of data included in the data samples. For example, the resulting model trained using data samples that included text-based interaction data and data identifying articles and documents relevant to the interaction data may be configured to receive text-based customer interaction data and output data identifying articles and documents relevant to the interaction data. As another example, the resulting model trained using data samples that included audio interaction data and data identifying a reason that a user requested the interaction may be configured to receive audio customer interaction data and output data identifying a reason that a user requested the interaction. As another example, the resulting model trained using data samples that included audio interaction data and data identifying a transcription of the interaction data may be configured to receive audio interaction data and output a transcription of the audio. As another example, the resulting model trained using data samples that included text-based interaction data and data identifying a sentiment of a user may be configured to receive audio interaction data and output data identifying a sentiment.

In some implementations, the model may output a confidence score that reflects a likelihood that the output is accurate. For example, the model may output a confidence score of 0.8 and the sentiment of frustrated indicating that there is an eighty percent likelihood that the sentiment of the user is frustrated. As another example, the model may output a confidence score of 0.4 and the reason that that first user called the second user do discuss a billing issue. That confidence score may indicate a forty percent likelihood that the first user called to discuss a billing issue.

The computing devices 520 provide the characteristic of the interaction between the first user and the second user and the customer interaction data as inputs to a second model that is configured to determine instructions for the second user to continue interacting with the first user during the interaction between the first user and the second user (1140). The computing devices 520 receive, from the second model, the instructions for the second user to continue interacting with the first user during the interaction between the first user and the second user (1150). In some implementations, the computing devices 520 may receive a customer summary file 528 that reflect characteristics of the first user. The computing devices 520 may provide the customer summary file 528 as an input to the first model and/or the second model. The customer summary file 528 may include billing information of the first user, data identifying a type of device of the first user, wireless carrier service level information, data of previous interactions between the first user and additional users, and/or any other similar information.

In some implementations, the computing devices 520 may select the second model from a group of multiple models. The multiple models may each be configured to receive similar types of data. For example, the models may be configured to receive the output of the first model, the customer interaction data 522, and/or the customer summary file 528. The output of the model may be the sentiment of the first user which may be frustrated, angry, or content. The computing devices 520 may select a model based on the sentiment of the first user. That model may be configured to receive the sentiment, the customer interaction data 522, and/or the customer summary file 528. The model may output instructions for the second user to continue interacting with the first user during the interaction between the first user and the second user. The instructions may specify how the second user should respond to the first user. This may include a script for the second user to speak to the first user, one or more topics to include in a statement or question to the first user, items of data that the second user should request from the first user, a concession that the second user should offer to the first user, an offer for the first user, and/or any other similar instructions.

In some implementations, the computing devices 520 may provide the output of the first model, the customer interaction data 522, and/or the customer summary file 528 to the second model and a third model. The computing devices 520 may determine to provide the output to multiple models for various reasons. In some instances, the computing devices 520 may access or store instructions that specify to determine various types of instructions for the second user. The second model may be configured to output a script for the second user, but the script may have a blank for a specific offer to provide the first user. The third model may be configured to output the offer.

The computing devices 520 may select a second model based on the confidence score output by the first model. For example, the computing devices 520 may receive a transcription of audio data from the first model. The confidence score may be 0.8. Based on the confidence score of 0.8, the computing devices 520 may select a model that is configured to receive the transcription, the customer interaction data 522, and/or the customer summary file 528. The computing devices 520 may have access to various models that are configured to receive the transcription, the customer interaction data 522, and/or the customer summary file 528 and may select the model that is configured to receive the transcription with the confidence score in the particular range.

In some implementations, the models that are configured to receive input data related to lower confidence scores may be more complex and computationally expensive than models that are configured to receive input data related to higher confidence scores. For example, a model may be configured to perform more analysis and processes on the customer interaction data 522 and/or the customer summary file 528 when the output of the first model includes a lower confidence score. A different model may be configured to preform less analysis and processes on the customer interaction data 522 and/or the customer summary file 528 when the output of the first model includes a higher confidence score. In some implementations, the models may be configured to weight the data related to the confidence score differently depending on the confidence score. For example, a model may weight a sentiment of satisfied with a confidence score of 0.8 higher than a sentiment of satisfied with a confidence score of 0.3.

The computing devices 520 may train the second model and additional models in a similar fashion to the models described above. The computing devices 520 may generate data samples from historical data. The computing devices 520 may group the data samples based on the type of data included in the data samples. The computing devices 520 may train the models using the data samples. Based on the type of data included in the data samples, the various models may be configured to receive and output similar types of data. In some instances, the computing devices 520 may group the data samples according to confidence scores included in some of the data in the data samples. For example, if the data samples included a sentiment of frustrated with a confidence score of 0.4 to 0.6, then the computing devices 520 may train a model using customer interaction data and/or customer summary file of those samples. The computing devices 520 may be configured to select this model if an initial model outputs a sentiment with a confidence score of 0.4 to 0.6.

The computing devices 520 provide, for output to the second user, the instructions for the second user to continue interacting with the first user (1160). In some implementations, the computing devices 520 may generate an interface that presents the instructions to the second user. In some implementations, the computing devices 520 may generate synthesized speech of the instructions and output audio to the second user.

The computing devices 520 may continue to use the models to generate additional instructions as the interaction continues. The computing devices may provide, to various models, the customer summary file 528, the customer interaction data 522 that includes the interactions previously provided to various models, outputs from models, and additional customer interaction data that includes the most recent utterances of the customer and the agent. The models may output additional instructions based on the customer summary file 528, the model outputs, and the customer interaction data 522 that includes the most recent interactions. The computing devices 520 may generate an interface to provide the additional instructions to the agent.

In some implementations, the computing devices 520 may determine that the interaction between the first user and the second user is complete. This may occur if either the first user or the second user hangs up the phone or ends the chat session.

The computing devices 520 may generate a summary of the interaction. The summary may be based on the instructions provided to the second user and the customer interaction data 522 of the interaction. The computing devices 520 may generate the summary in a narrative format. In some implementations, the computing devices 520 may provide the summary to the first user. The first user may edit the summary as needed, such as to correct any errors. The computing devices 520 may store the summary in the customer information databases 516. The computing devices 520 may indicate to which customer the summary corresponds. In this case, the customer information data 516 may include the summary in the customer summary file 528 for that customer. The next time that same customer calls, the computing devices 520 may receive the customer summary file 528 that includes that summary and any summaries from other previous interactions with the same customer.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
   establishing, by an audio service, a session initiation protocol (SIP) session with a contact center service;
   during the SIP session and during an interaction between a first user and a second user, receiving, by a SIP module of the audio service, an incoming audio stream associated with the first user and an outgoing stream associated with the second user;
   generating, by the SIP module, stream status events associated with the incoming audio stream and the outgoing audio stream;
   providing, by the SIP module and to a stream handler ensemble, the stream status events;
   based on the stream status events, selecting, by the stream handler ensemble, portions of the incoming audio stream and the outgoing audio stream for transcription by a transcription service;
   generating, by the stream handler ensemble, a stateful connection node that is configured to maintain a state until removed or deactivated;
   providing, by the stream handler ensemble, to the transcription service, and through the stateful connection node, the portions of the incoming audio stream and the outgoing audio stream;
   providing, by the stream handler ensemble and to the transcription service over a stateless message bus, data related to when the portions of the incoming audio stream and the outgoing audio stream begin and end or data related to the opening and closing of the portions of the incoming audio stream and the outgoing audio stream;
   receiving historical data that includes, for each previous interaction between various users, previous transcriptions from portions of previous incoming and outgoing audio streams of previous voice communications between previous users of the various users, previous characteristics of the communications between the previous users, previous actions performed by one of the previous users, and a previous customer summary file another of the previous users;
   training, using machine learning and the historical data, a first model and additional first models that are configured to identify a given characteristic of given first communications based on receiving (i) a given first transcription from given first portions of given first incoming and first outgoing audio streams of given first voice communications between given first users and (ii) a given first customer summary file of one of the given first users;
   training, using machine learning and the historical data, a second model and additional second models that are configured to identify a given script and instructions to read the script based on receiving (i) a given second transcription from given second portions of given second incoming and second outgoing audio streams of given second voice communications between given second users, (ii) a given second characteristic of the given second voice communications, and (iii) a given second customer summary file of one of the given second users;
   receiving, by the stream handler ensemble, from the transcription service, and through the stateful connection node, transcriptions of the portions of the incoming audio stream and the outgoing audio stream;
   receiving a customer summary file that reflects characteristics of the first user;
   providing the transcriptions of the portions of the incoming audio stream and the outgoing audio stream and the customer summary file to the first model that is configured to determine a first characteristic of the interaction between the first user and the second user;
   receiving, from the first model, the first characteristic of the interaction between the first user and the second user;
   based on the first characteristic of the interaction between the first user and the second user, selecting the second model from among the second model and the additional second models;
   providing the transcriptions of the portions of the incoming audio stream and the outgoing audio stream and the customer summary file to the second model that is configured to determine a script for the second user to speak to the first user during the interaction between the first user and the second user;
   receiving, from the second model, the script for the second user to speak to the first user during the interaction between the first user and the second user;
   providing, for output to the second user, the script for the second user to speak to the first user during the interaction between the first user and the second user;
   receiving, from the second user, feedback associated with the script that was for the second user to speak to the first user during the interaction between the first user and the second user;
   retraining the second model and the additional second models using machine learning and using (i) the historical data, (ii) the script that was for the second user to speak to the first user during the interaction between the first user and the second user, (iii) the customer summary file, (iv) the transcriptions of the portions of the incoming audio stream and the outgoing audio stream, and (v) the feedback associated with the script that was for the second user to speak to the first user during the interaction between the first user and the second user;

during an additional interaction between an additional first user and an additional second user, receiving, by the SIP module of the audio service, an additional incoming audio stream associated with the additional first user and an additional outgoing stream associated with the additional second user;

selecting, by the stream handler ensemble, portions of the additional incoming audio stream and the additional outgoing audio stream for transcription by the transcription service;

providing, by the stream handler ensemble and to the transcription service, the portions of the additional incoming audio stream and the additional outgoing audio stream;

receiving, by the stream handler ensemble and from the transcription service, transcriptions of the portions of the additional incoming audio stream and the additional outgoing audio stream;

receiving an additional customer summary file that reflects characteristics of the first user;

providing the transcriptions of the portions of the additional incoming audio stream and the additional outgoing audio stream and the additional customer summary file to the first model;

receiving, from the first model, an additional first characteristic of the additional interaction between the additional first user and the additional second user;

based on the additional first characteristic of the additional interaction between the additional first user and the additional second user, selecting the retrained second model from among the retrained second model and the retrained additional second models;

providing the transcriptions of the portions of the additional incoming audio stream and the additional outgoing audio stream and the additional customer summary file to the retrained second model;

receiving, from the retrained second model, an additional script for the additional second user to speak to the additional first user during the additional interaction between the additional first user and the additional second user; and providing, for output to the additional second user, the additional script for the additional second user to speak to the additional first user during the additional interaction between the additional first user and the additional second user.

2. The method of claim 1, wherein the customer summary file comprises billing information of the first user, data identifying a type of device of the first user, wireless carrier service level information, data of previous interactions between the first user and additional users.

3. The method of claim 1, wherein the first user and the additional first user are customers of a wireless carrier and the second user and the additional second users are customer service representatives of the wireless carrier.

4. The method of claim 1, comprising:
after providing, for output to the second user, the script, receiving customer interaction data that reflects a further interaction between the first user and the second user;
based on the customer interaction data and the customer summary file, determining a further script for the second user to speak to the first user during the interaction between the first user and the second user; and based on determining the further script, providing, for output to the second user, the further script for the second user to speak to the first user.

5. The method of claim 1, comprising:
determining that the interaction between the first user and the second user is complete;
based on determining that the interaction between the first user and the second user is complete, generating a summary of the interaction between the first user and the second user; and
storing the summary of the interaction in association with the customer summary file that reflects characteristics of the first user.

6. The method of claim 5, comprising:
providing, for output to the second user, the summary of the interaction;
receiving, from the second user, modifications to the summary of the interaction; and
based on the modifications to the summary of the interaction, updating the summary of the interaction.

7. The method of claim 1, wherein the transcriptions of the portions of the incoming audio stream and the outgoing audio stream generated by the transcription service include labels associated with segments of the transcriptions, each label identifying an emotion of a speaker of a corresponding segment or a sentiment of the speaker of the corresponding segment.

8. A system, comprising:
one or more processors; and
memory including a plurality of computer-executable components that are executable by the one or more processors to perform a plurality of actions, the plurality of acts comprising:
establishing, by an audio service, a session initiation protocol (SIP) session with a contact center service;
during the SIP session and during an interaction between a first user and a second user, receiving, by a SIP module of the audio service, an incoming audio stream associated with the first user and an outgoing stream associated with the second user;
generating, by the SIP module, stream status events associated with the incoming audio stream and the outgoing audio stream;
providing, by the SIP module and to a stream handler ensemble, the stream status events;
based on the stream status events, selecting, by the stream handler ensemble, portions of the incoming audio stream and the outgoing audio stream for transcription by a transcription service;
generating, by the stream handler ensemble, a stateful connection node that is configured to maintain a state until removed or deactivated;
providing, by the stream handler ensemble, to the transcription service, and through the stateful connection node, the portions of the incoming audio stream and the outgoing audio stream;
providing, by the stream handler ensemble and to the transcription service over a stateless message bus, data related to when the portions of the incoming audio stream and the outgoing audio stream begin and end or data related to the opening and closing of the portions of the incoming audio stream and the outgoing audio stream;
receiving historical data that includes, for each previous interaction between various users, previous transcriptions from portions of previous incoming and outgoing audio streams of previous voice communications between previous users of the various users, previous characteristics of the communications between the previous users, previous actions performed by one of the previous users, and a previous customer summary file another of the previous users;

training, using machine learning and the historical data, a first model and additional first models that are configured to identify a given characteristic of given first communications based on receiving (i) a given first transcription from given first portions of given first incoming and first outgoing audio streams of given first voice communications between given first users and (ii) a given first customer summary file of one of the given first users;

training, using machine learning and the historical data, a second model and additional second models that are configured to identify a given script and instructions to read the script based on receiving (i) a given second transcription from given second portions of given second incoming and second outgoing audio streams of given second voice communications between given second users, (ii) a given second characteristic of the given second voice communications, and (iii) a given second customer summary file of one of the given second users;

receiving, by the stream handler ensemble, from the transcription service, and through the stateful connection node, transcriptions of the portions of the incoming audio stream and the outgoing audio stream;

receiving a customer summary file that reflects characteristics of the first user;

providing the transcriptions of the portions of the incoming audio stream and the outgoing audio stream and the customer summary file to the first model that is configured to determine a first characteristic of the interaction between the first user and the second user;

receiving, from the first model, the first characteristic of the interaction between the first user and the second user;

based on the first characteristic of the interaction between the first user and the second user, selecting the second model from among the second model and the additional second models;

providing the transcriptions of the portions of the incoming audio stream and the outgoing audio stream and the customer summary file to the second model that is configured to determine a script for the second user to speak to the first user during the interaction between the first user and the second user;

receiving, from the second model, the script for the second user to speak to the first user during the interaction between the first user and the second user;

providing, for output to the second user, the script for the second user to speak to the first user during the interaction between the first user and the second user;

receiving, from the second user, feedback associated with the script that was for the second user to speak to the first user during the interaction between the first user and the second user;

retraining the second model and the additional second models using machine learning and using (i) the historical data, (ii) the script that was for the second user to speak to the first user during the interaction between the first user and the second user, (iii) the customer summary file, (iv) the transcriptions of the portions of the incoming audio stream and the outgoing audio stream, and (v) the feedback associated with the script that was for the second user to speak to the first user during the interaction between the first user and the second user;

during an additional interaction between an additional first user and an additional second user, receiving, by the SIP module of the audio service, an additional incoming audio stream associated with the additional first user and an additional outgoing stream associated with the additional second user;

selecting, by the stream handler ensemble, portions of the additional incoming audio stream and the additional outgoing audio stream for transcription by the transcription service;

providing, by the stream handler ensemble and to the transcription service, the portions of the additional incoming audio stream and the additional outgoing audio stream;

receiving, by the stream handler ensemble and from the transcription service, transcriptions of the portions of the additional incoming audio stream and the additional outgoing audio stream;

receiving an additional customer summary file that reflects characteristics of the first user;

providing the transcriptions of the portions of the additional incoming audio stream and the additional outgoing audio stream and the additional customer summary file to the first model;

receiving, from the first model, an additional first characteristic of the additional interaction between the additional first user and the additional second user;

based on the additional first characteristic of the additional interaction between the additional first user and the additional second user, selecting the retrained second model from among the retrained second model and the retrained additional second models;

providing the transcriptions of the portions of the additional incoming audio stream and the additional outgoing audio stream and the additional customer summary file to the retrained second model;

receiving, from the retrained second model, an additional script for the additional second user to speak to the additional first user during the additional interaction between the additional first user and the additional second user; and providing, for output to the additional second user, the additional script for the additional second user to speak to the additional first user during the additional interaction between the additional first user and the additional second user.

9. The system of claim 8, wherein the customer summary file comprises billing information of the first user, data identifying a type of device of the first user, wireless carrier service level information, data of previous interactions between the first user and additional users.

10. The system of claim 8, wherein the first user and the additional first user are customers of a wireless carrier and the second user and the additional second users are customer service representatives of the wireless carrier.

11. The system of claim 8, wherein the plurality of acts comprise:
- after providing, for output to the second user, the script, receiving customer interaction data that reflects a further interaction between the first user and the second user;
- based on the customer interaction data and the customer summary file, determining a further script for the second user to speak to the first user during the interaction between the first user and the second user; and
- based on determining the further script, providing, for output to the second user, the further script for the second user to speak to the first user.

12. The system of claim 8, wherein the plurality of acts comprise:
- determining that the interaction between the first user and the second user is complete;
- based on determining that the interaction between the first user and the second user is complete, generating a summary of the interaction between the first user and the second user; and
- storing the summary of the interaction in association with the customer summary file that reflects characteristics of the first user.

13. One or more non-transitory computer-readable media storing computer-executable instructions that upon execution cause one or more computers to perform acts comprising:
- establishing, by an audio service, a session initiation protocol (SIP) session with a contact center service;
- during the SIP session and during an interaction between a first user and a second user, receiving, by a SIP module of the audio service, an incoming audio stream associated with the first user and an outgoing stream associated with the second user;
- generating, by the SIP module, stream status events associated with the incoming audio stream and the outgoing audio stream;
- providing, by the SIP module and to a stream handler ensemble, the stream status events;
- based on the stream status events, selecting, by the stream handler ensemble, portions of the incoming audio stream and the outgoing audio stream for transcription by a transcription service;
- generating, by the stream handler ensemble, a stateful connection node that is configured to maintain a state until removed or deactivated;
- providing, by the stream handler ensemble, to the transcription service, and through the stateful connection node, the portions of the incoming audio stream and the outgoing audio stream;
- providing, by the stream handler ensemble and to the transcription service over a stateless message bus, data related to when the portions of the incoming audio stream and the outgoing audio stream begin and end or data related to the opening and closing of the portions of the incoming audio stream and the outgoing audio stream;
- receiving historical data that includes, for each previous interaction between various users, previous transcriptions from portions of previous incoming and outgoing audio streams of previous voice communications between previous users of the various users, previous characteristics of the communications between the previous users, previous actions performed by one of the previous users, and a previous customer summary file another of the previous users;
- training, using machine learning and the historical data, a first model and additional first models that are configured to identify a given characteristic of given first communications based on receiving (i) a given first transcription from given first portions of given first incoming and first outgoing audio streams of given first voice communications between given first users and (ii) a given first customer summary file of one of the given first users;
- training, using machine learning and the historical data, a second model and additional second models that are configured to identify a given script and instructions to read the script based on receiving (i) a given second transcription from given second portions of given second incoming and second outgoing audio streams of given second voice communications between given second users, (ii) a given second characteristic of the given second voice communications, and (iii) a given second customer summary file of one of the given second users;
- receiving, by the stream handler ensemble, from the transcription service, and through the stateful connection node, transcriptions of the portions of the incoming audio stream and the outgoing audio stream;
- receiving a customer summary file that reflects characteristics of the first user;
- providing the transcriptions of the portions of the incoming audio stream and the outgoing audio stream and the customer summary file to the first model that is configured to determine a first characteristic of the interaction between the first user and the second user;
- receiving, from the first model, the first characteristic of the interaction between the first user and the second user;
- based on the first characteristic of the interaction between the first user and the second user, selecting the second model from among the second model and the additional second models;
- providing the transcriptions of the portions of the incoming audio stream and the outgoing audio stream and the customer summary file to the second model that is configured to determine a script for the second user to speak to the first user during the interaction between the first user and the second user;
- receiving, from the second model, the script for the second user to speak to the first user during the interaction between the first user and the second user;
- providing, for output to the second user, the script for the second user to speak to the first user during the interaction between the first user and the second user;
- receiving, from the second user, feedback associated with the script that was for the second user to speak to the first user during the interaction between the first user and the second user;
- retraining the second model and the additional second models using machine learning and using (i) the historical data, (ii) the script that was for the second user to speak to the first user during the interaction between the first user and the second user, (iii) the customer summary file, (iv) the transcriptions of the portions of the incoming audio stream and the outgoing audio stream, and (v) the feedback associated with the script that was for the second user to speak to the first user during the interaction between the first user and the second user;
- during an additional interaction between an additional first user and an additional second user, receiving, by the SIP module of the audio service, an additional incoming audio stream associated with the additional first user and an additional outgoing stream associated with the additional second user;

selecting, by the stream handler ensemble, portions of the additional incoming audio stream and the additional outgoing audio stream for transcription by the transcription service;

providing, by the stream handler ensemble and to the transcription service, the portions of the additional incoming audio stream and the additional outgoing audio stream;

receiving, by the stream handler ensemble and from the transcription service, transcriptions of the portions of the additional incoming audio stream and the additional outgoing audio stream;

receiving an additional customer summary file that reflects characteristics of the first user;

providing the transcriptions of the portions of the additional incoming audio stream and the additional outgoing audio stream and the additional customer summary file to the first model;

receiving, from the first model, an additional first characteristic of the additional interaction between the additional first user and the additional second user;

based on the additional first characteristic of the additional interaction between the additional first user and the additional second user, selecting the retrained second model from among the retrained second model and the retrained additional second models;

providing the transcriptions of the portions of the additional incoming audio stream and the additional outgoing audio stream and the additional customer summary file to the retrained second model;

receiving, from the retrained second model, an additional script for the additional second user to speak to the additional first user during the additional interaction between the additional first user and the additional second user; and providing, for output to the additional second user, the additional script for the additional second user to speak to the additional first user during the additional interaction between the additional first user and the additional second user.

* * * * *